US012017892B2

(12) United States Patent
Bjorback

(10) Patent No.: US 12,017,892 B2
(45) Date of Patent: Jun. 25, 2024

(54) COMBINATION CRANE AND METHODS OF USE

(71) Applicant: John Alan Bjorback, Sioux Falls, SD (US)

(72) Inventor: John Alan Bjorback, Sioux Falls, SD (US)

(73) Assignee: Kraniac, Inc., Sioux Falls, SD (US)

( * ) Notice: Subject to any disclaimer, the term of this patent is extended or adjusted under 35 U.S.C. 154(b) by 0 days.

(21) Appl. No.: 18/219,420

(22) Filed: Jul. 7, 2023

(65) Prior Publication Data

US 2023/0348239 A1 Nov. 2, 2023

Related U.S. Application Data

(63) Continuation of application No. 17/525,783, filed on Nov. 12, 2021, now Pat. No. 11,731,862, which is a continuation-in-part of application No. 17/182,923, filed on Feb. 23, 2021, now Pat. No. 11,174,135.

(60) Provisional application No. 63/105,188, filed on Oct. 23, 2020.

(51) Int. Cl.
*B66C 17/00* (2006.01)
*B66C 17/04* (2006.01)
*B66C 23/28* (2006.01)

(52) U.S. Cl.
CPC .............. *B66C 17/04* (2013.01); *B66C 23/28* (2013.01)

(58) Field of Classification Search
CPC .... B66C 5/04; B66C 7/04; B66C 7/08; B66C 9/02; B66C 11/06; B66C 19/00; B66C 17/00; B66C 17/04; B66C 23/28
See application file for complete search history.

(56) References Cited

U.S. PATENT DOCUMENTS

| | | | |
|---|---|---|---|
| 2,335,522 A | 11/1943 | Tourneau | |
| 3,547,277 A | 12/1970 | Strayer | |
| 3,684,104 A | 8/1972 | Oda | |
| 3,784,028 A | 1/1974 | Stewart | |
| 5,489,032 A | 2/1996 | Mayhall | |
| 5,645,180 A | 7/1997 | Zaguroli | |
| 5,788,096 A | 8/1998 | Wilcox | |
| 5,833,030 A * | 11/1998 | Klockner | B66C 1/20 414/428 |
| 6,354,782 B1 | 3/2002 | Barry | |
| 7,043,337 B2 | 5/2006 | Colgate | |

(Continued)

FOREIGN PATENT DOCUMENTS

| | | |
|---|---|---|
| CN | 201567160 U | 9/2010 |
| CN | 105905816 A | 6/2016 |

*Primary Examiner* — Emmanuel M Marcelo

(74) *Attorney, Agent, or Firm* — Gallium Law; Wesley Schwie; Isabel Fox

(57) ABSTRACT

A crane may comprise a mast that includes a base end and a top end located opposite the base end, at least one support beam fixedly coupled to the mast adjacent the top end of the mast, a first runway beam fixedly coupled to the at least one support beam, and a second runway beam spaced from the first runway beam. In some embodiments, the first runway beam defines a first end and a second end, and the mast is located closer to the first end than the second end. The crane may also comprise a bridge movably coupled to the first runway beam and the second runway beam, a trolley movably coupled to the bridge, and a hoist coupled to the trolley. In some embodiments, the crane only comprises one mast.

20 Claims, 36 Drawing Sheets

(56) References Cited

U.S. PATENT DOCUMENTS

| | | | |
|---|---|---|---|
| 7,413,394 | B2 | 8/2008 | Risser |
| 7,478,597 | B2 | 1/2009 | Schroeder |
| 8,678,209 | B2 | 3/2014 | Chernyak |
| 10,421,645 | B2 | 9/2019 | Givens |
| 10,640,335 | B2 | 5/2020 | Donahue |
| 2003/0091423 | A1 | 5/2003 | Quiring |
| 2003/0160016 | A1 | 8/2003 | Ortiz |
| 2003/0161708 | A1 | 8/2003 | Johnston |
| 2007/0023379 | A1 | 2/2007 | Kahlman |
| 2007/0163982 | A1 | 7/2007 | Lichinchi |
| 2009/0283490 | A1 | 11/2009 | Givens |
| 2011/0180507 | A1 | 7/2011 | Givens |
| 2015/0076100 | A1* | 3/2015 | Ellicott ................. B66C 15/065 212/278 |
| 2018/0044146 | A1 | 2/2018 | Donahue |

* cited by examiner

COMBINATION CRANE AND METHODS OF USE

CROSS-REFERENCE TO RELATED APPLICATIONS

The present application claims priority to U.S. patent application Ser. No. 17/525,783; filed on Nov. 12, 2021; entitled "COMBINATION CRANE AND METHODS OF USE;" the entire disclosure of which is incorporated by reference herein.

The present application claims priority to U.S. patent application Ser. No. 17/182,923; filed on Feb. 23, 2021; issued as U.S. Pat. No. 11,174,135 on Nov. 16, 2021; entitled "COMBINATION CRANE AND METHODS OF USE;" the entire disclosure of which is incorporated by reference herein.

The present application claims priority to U.S. Provisional Patent Application No. 63/105,188; filed on Oct. 23, 2020; entitled "COMBINATION CRANE AND METHODS OF USE;" the entire disclosure of which is incorporated by reference herein.

BACKGROUND OF THE INVENTION

Field

Various embodiments disclosed herein to cranes. Certain embodiments relate to combination cranes.

Description of Related Art

A crane is often used in construction, warehouse, and factory settings for lifting, moving, and/or carrying heavy objects. Two common types of crane are a jib crane, comprising a single jib arm coupled to a column, and a workstation crane, which generally includes multiple columns or an overhead support system coupled to a ceiling at multiple points. Both types of cranes include a trolley coupled to a hoist, which is then coupled to the object to be lifted and/or moved. On a jib crane, the trolley is configured to slide along the jib arm, which is often configured to rotate about the column. Workstation cranes generally include two runway beams with a bridge configured to slide along the runway beams. The trolley is coupled to the bridge, and also configured to slide along the bridge.

These two types of cranes have substantial utility, but each has shortcomings with respect to weight capacity, span and reach, space required for use, and installation time. For example, both jib cranes and workstation cranes require significant installation time. Workstation cranes have a large footprint and commonly break up the workflow on a factory floor. Jib cranes may be limited with regards to their span and reach. Accordingly, there is a need for a crane that remedies these deficiencies.

SUMMARY OF THE INVENTION

The disclosure includes a crane comprising a mast extending along a vertical direction, the mast comprising a base end and a top end located opposite the base end; at least one support beam, the at least one support beam fixedly coupled to the mast adjacent the top end of the mast; a first runway beam extending along a horizontal direction perpendicular to the vertical direction, the first runway beam fixedly coupled to the at least one support beam, and a second runway beam extending along the horizontal direction, the second runway beam spaced from the first runway beam, and the second runway beam fixedly coupled to the at least one support beam. In some embodiments, the crane further comprises a bridge movably coupled to the first runway beam and the second runway beam, the bridge arranged and configured to move between a first location and a second location of the first runway beam and the second runway beam; a trolley movably coupled to the bridge, wherein the trolley is arranged and configured to move between a first location and a second location of the bridge; and a hoist coupled to the trolley, the hoist configured to lift and lower an object with respect to the trolley.

In some embodiments, the mast is located adjacent a center portion of the first runway beam. The mast may be located adjacent an end portion of the first runway beam. In some embodiments, the at least one support beam is arranged and configured to rotate about the mast. The first runway beam and the second runway beam may be substantially parallel to each other. In some embodiments, the horizontal direction is a first horizontal direction, and the bridge extends along a second horizontal direction that is perpendicular to the first horizontal direction and the vertical direction.

In many embodiments, the at least one support beam comprises a first support beam extending along a first direction and a second support beam extending along a second direction, the first support beam and the second support beam each comprising a first end fixedly coupled to the mast and a second end fixedly coupled to the second runway beam. The at least one support beam may also comprise a third support beam extending along a third direction and a fourth support beam extending along a fourth direction, and the third support beam and the fourth support beam may each comprise a first end fixedly coupled to the mast and a second end fixedly coupled to the first runway beam. In some embodiments, each of the first direction, the second direction, the third direction, and the fourth direction are perpendicular to the vertical direction.

In many embodiments, the crane further comprises a fifth support beam, a sixth support beam, a seventh support beam, and an eighth support beam, the fifth support beam, the sixth support beam, the seventh support beam, and the eighth support beam each comprising a first end fixedly coupled to the mast and a second end fixedly coupled to the at least one support beam. The fifth support beam may extend along a fifth direction, the sixth support beam may extend along a sixth direction, the seventh support beam may extend along a seventh direction, and the eighth support beam may extend along an eighth direction.

In some embodiments, the fifth support beam extends from the top end of the mast to the first support beam, whereby the fifth support beam is fixedly coupled to the first support beam at a location between the first end and the second end of the first support beam. The sixth support beam may extend from the top end of the mast to the second support beam, whereby the sixth support beam may be fixedly coupled to the second support beam at a location between the first end and the second end of the second support beam. In some embodiments, the seventh support beam extends from the top end of the mast to the third support beam, whereby the seventh support beam is fixedly coupled to the third support beam at a location between the first end and the second end of the third support beam. The eighth support beam may extend from the top end of the mast to the fourth support beam, whereby the eighth support beam may be fixedly coupled to the fourth support beam at a location between the first end and the second end of the fourth support beam.

In many embodiments, the fifth support beam is fixedly coupled to a top surface of the first support beam and the second runway beam is fixedly coupled to a bottom surface of the first support beam, wherein the bottom surface is located opposite the top surface. The sixth support beam may be fixedly coupled to a top surface of the second support beam and the second runway beam may be fixedly coupled to a bottom surface of the second support beam, wherein the bottom surface is located opposite the top surface. In some embodiments, the seventh support beam is fixedly coupled to a top surface of the third support beam and the first runway beam is fixedly coupled to a bottom surface of the third support beam, wherein the bottom surface is located opposite the top surface. The eighth support beam may be fixedly coupled to a top surface of the fourth support beam and the first runway beam may be fixedly coupled to a bottom surface of the fourth support beam, wherein the bottom surface is located opposite the top surface.

In some embodiments, the base end of the mast is fixedly coupled to a ground surface, and the base end comprises a first support portion that extends along a ninth direction perpendicular to the vertical direction. The base end of the mast may further comprise a second support portion extending along a tenth direction and a third support portion extending along an eleventh direction, wherein each of the second support portion and the third support portion extend perpendicular to the vertical direction and the ninth direction. In many embodiments, the tenth direction extends opposite the eleventh direction.

The base end of the mast may be fixedly coupled to a counterweight, and the counterweight may be restably coupled to a ground surface. In some embodiments, the base end of the mast comprises at least one support portion extending along a twelfth direction, wherein the at least one support portion defines a length directly related to a capacity of the crane.

The disclosure includes a method of using a crane to lift and lower an object, the method comprising detachably coupling the object to a hoist, wherein the hoist is at least one of mechanically and electrically coupled to a trolley, electrically coupling the hoist to a power source, and engaging the hoist, via the power source, to lift and lower the object, wherein the trolley is movably coupled to a bridge such that the trolley is arranged and configured to move between a first location and a second location of the bridge, the bridge is movably coupled to a first runway beam and a second runway beam such that the bridge is arranged and configured to move between a first location and a second location of the first runway beam and the second runway beam, the first runway beam and the second runway beam are fixedly coupled to at least one support beam, and the at least one support beam is fixedly coupled to a mast.

The disclosure includes a crane comprising a mast extending along a vertical direction, the mast comprising a base end and a top end located opposite the base end, at least one support beam, the at least one support beam fixedly coupled to the mast adjacent the top end of the mast, a first runway beam extending along a horizontal direction perpendicular to the vertical direction, the first runway beam defining a first end and a second end whereby the first end is located closer to the mast than the second end, the first runway beam fixedly coupled to the at least one support beam, and a second runway beam extending along the horizontal direction, the second runway beam spaced from the first runway beam, and the second runway beam fixedly coupled to the at least one support beam, a bridge movably coupled to the first runway beam and the second runway beam, the bridge arranged and configured to move between a first location and a second location of the first runway beam and the second runway beam, a trolley movably coupled to the bridge, wherein the trolley is arranged and configured to move between a first location and a second location of the bridge, and a hoist coupled to the trolley, the hoist configured to lift and lower an object with respect to the trolley.

In some embodiments, the first end of the first runway beam is located adjacent the mast. The horizontal direction may define a first horizontal direction, wherein the bridge may extend along a second horizontal direction perpendicular to the first horizontal direction and the vertical direction. In some embodiments, the at least one support beam comprises a first support beam extending along a first direction, a second support beam extending along a second direction, and a third support beam extending along a third direction. The first support beam may comprise a first end fixedly coupled to the mast and a second end fixedly coupled to the first runway beam, wherein the second support beam and the third support beam may each comprise a first end fixedly coupled to the mast and a second end fixedly coupled to the second runway beam.

In some embodiments, the crane further comprises a fourth support beam extending along a fourth direction, a fifth support beam extending along a fifth direction, and a sixth support beam extending along a sixth direction. The fourth support beam may extend from the top end of the mast to the first support beam, whereby the fourth support beam may be fixedly coupled to the first support beam at a location between the first end and the second end of the first support beam. In some embodiments, the fourth support beam is fixedly coupled to a top surface of the first support beam and the first runway beam is fixedly coupled to a bottom surface of the first support beam, wherein the bottom surface is located opposite the top surface. The fifth support beam may extend from the top end of the mast to the second support beam, whereby the fifth support beam may be fixedly coupled to the second support beam at a location between the first end and the second end of the second support beam. In some embodiments, the fifth support beam is fixedly coupled to a top surface of the second support beam and the second runway beam is fixedly coupled to a bottom surface of the second support beam, wherein the bottom surface is located opposite the top surface. The sixth support beam may extend from the top end of the mast to the third support beam, whereby the sixth support beam may be fixedly coupled to the third support beam at a location between the first end and the second end of the third support beam. In some embodiments, the sixth support beam is fixedly coupled to a top surface of the third support beam and the second runway beam is fixedly coupled to a bottom surface of the third support beam, wherein the bottom surface is located opposite the top surface.

The base end of the mast may be fixedly coupled to a ground surface, and the base end may comprise a first support portion extending along a seventh direction perpendicular to the vertical direction, a second support portion extending along an eighth direction, and a third support portion extending along a ninth direction. In some embodiments, each of the second support portion and the third support portion extend perpendicular to the vertical direction and the seventh direction, and the ninth direction extends opposite the eighth direction. The base end of the mast may be fixedly coupled to a counterweight, wherein the counterweight may be restably coupled to a ground surface. In some embodiments, the counterweight comprises at least one of a plurality of wheels configured to roll and a plurality of forklift pockets, each forklift pocket of the plurality of forklift pockets configured to receive a fork of a forklift. The base end of the mast may comprise at least one support portion extending along a tenth direction, wherein the at least one support portion defines a length directly related to a capacity of the crane.

The disclosure includes a method of using a crane to lift and lower an object, the method comprising detachably coupling the object to a hoist operatively coupled to a trolley, electrically coupling the hoist to a power source, and engaging the hoist, via the power source, to lift and lower the object. In some embodiments, the trolley is movably coupled to a bridge such that the trolley is arranged and configured to move between a first location and a second location of the bridge, the bridge is movably coupled to a first runway beam and a second runway beam such that the bridge is arranged and configured to move between a first location and a second location of the first runway beam and the second runway beam, the first runway beam and the second runway beam are fixedly coupled to at least one support beam, and the at least one support beam is fixedly coupled to a building column.

The first runway beam may define a first end and a second end whereby the first end is located closer to the building column than the second end. In some embodiments, the building column extends along a vertical direction and comprises an upper portion located adjacent a ceiling of a building and a lower portion located adjacent a floor of the building. The at least one support beam may be fixedly coupled to the upper portion of the building column.

BRIEF DESCRIPTION OF DRAWINGS

These and other features, aspects, and advantages are described below with reference to the drawings, which are intended to illustrate, but not to limit, the invention. In the drawings, like reference characters denote corresponding features consistently throughout similar embodiments.

LIST OF REFERENCE NUMERALS

10—crane
12—mast
13—mast
14—base end
16—top end
17—top end
18—at least one support beam
19—at least one support beam
20*a*—first runway beam
20*b*—second runway beam
21*a*—first runway beam
21*b*—second runway beam
22—bridge
23—bridge
24*a*—first location (of runway beams)
24*b*—second location (of runway beams)
24*c*—third location (of runway beams)
24*d*—fourth location (of runway beams)
25*a*—first end (of first runway beam)
25*b*—second end (of first runway beam)
26—trolley
28*a*—first location (of bridge)
28*b*—second location (of bridge)
30—hoist
32—object
38*a-d*—first end (of respective support beam)
40*a-d*—second end (of respective support beam)
42—top surface (of first support beam)
44—bottom surface (of first support beam)
48*a*—first support portion
48*b*—second support portion
48*c*—third support portion
50—counterweight
52—hex base
54—forklift pocket
56—building column
57—building column
58—trussed support beam
59*a*—upper portion (of building column)
59*b*—lower portion (of building column)
60—ceiling
62—floor

DETAILED DESCRIPTION OF THE INVENTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. All such aspects or advantages are not necessarily achieved by any particular embodiment. For example, various embodiments may be carried out in a manner that achieves or optimizes one advantage or group of advantages as taught herein without necessarily achieving other aspects or advantages as may also be taught or suggested herein.

An Objective of the present invention is to provide a crane that comprises a hybrid structure of a jib crane and a workstation crane to thereby capitalize on the benefits of each crane.

Figure 1:
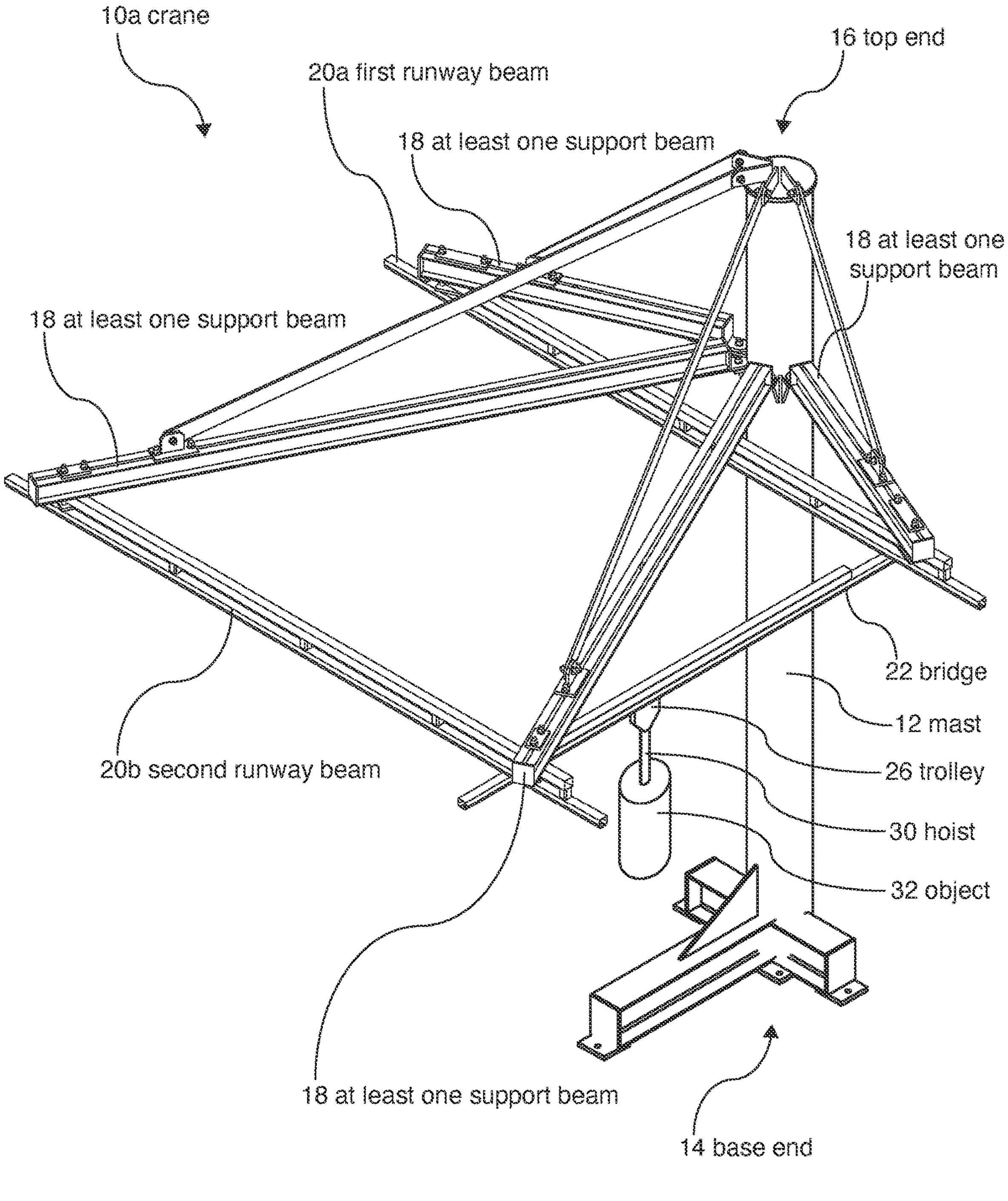
FIGS. 1, 2, 3, 4, and 5 illustrate perspective views of a crane including at least one support beam, according to some embodiments.

FIG. 1 shows a perspective view of a crane 10*a*, according to some embodiments. As demonstrated, the crane 10*a* may include a mast 12 comprising a top end 16 and a base end 14 located opposite the top end 16, a first runway beam 20*a*, a second runway beam 20*b* spaced from the first runway beam 20*a*, a bridge 22, a trolley 26, a hoist 30, and an object 32. In many embodiments, the crane 10*a* also includes at least one support beam 18 coupled to the mast 12 adjacent the top end 16. In some embodiments, the at least one support beam 18 is coupled to the mast 12 closer to the top end 16 than the base end 14. The at least one support beam 18 will be discussed further with reference to FIGS. 2-5.

In some embodiments, both the first runway beam 20*a* and the second runway beam 20*b* are fixedly coupled to the at least one support beam 18. As shown in FIG. 1, the first runway beam 20*a* may be coupled to a different beam of the at least one support beam 18 than the second runway beam 20*b*. In many embodiments, the first runway beam 20*a* is located adjacent the mast 12 and the second runway beam 20*b* is spaced from the first runway beam 20*a*. The first runway beam 20*a* and second runway beam 20*b* may be substantially parallel to each other. The mast 12 may be located adjacent a center portion of the first runway beam 20*a*, as shown in FIG. 1. In some embodiments, the mast 12 is located adjacent an end portion of the first runway beam 20*a*. The bridge 22 may be coupled to both the first runway beam 20*a* and the second runway beam 20*b*. In many embodiments, the bridge 22 is movably coupled to the first and second runway beams 20*a*, 20*b*, and is configured to move between a first location and a second location of the first runway beam 20*a* and the second runway beam 20*b*. Movement of the bridge 22 is illustrated in FIGS. 28-31, and will be discussed further later in the disclosure.

Figure 6:
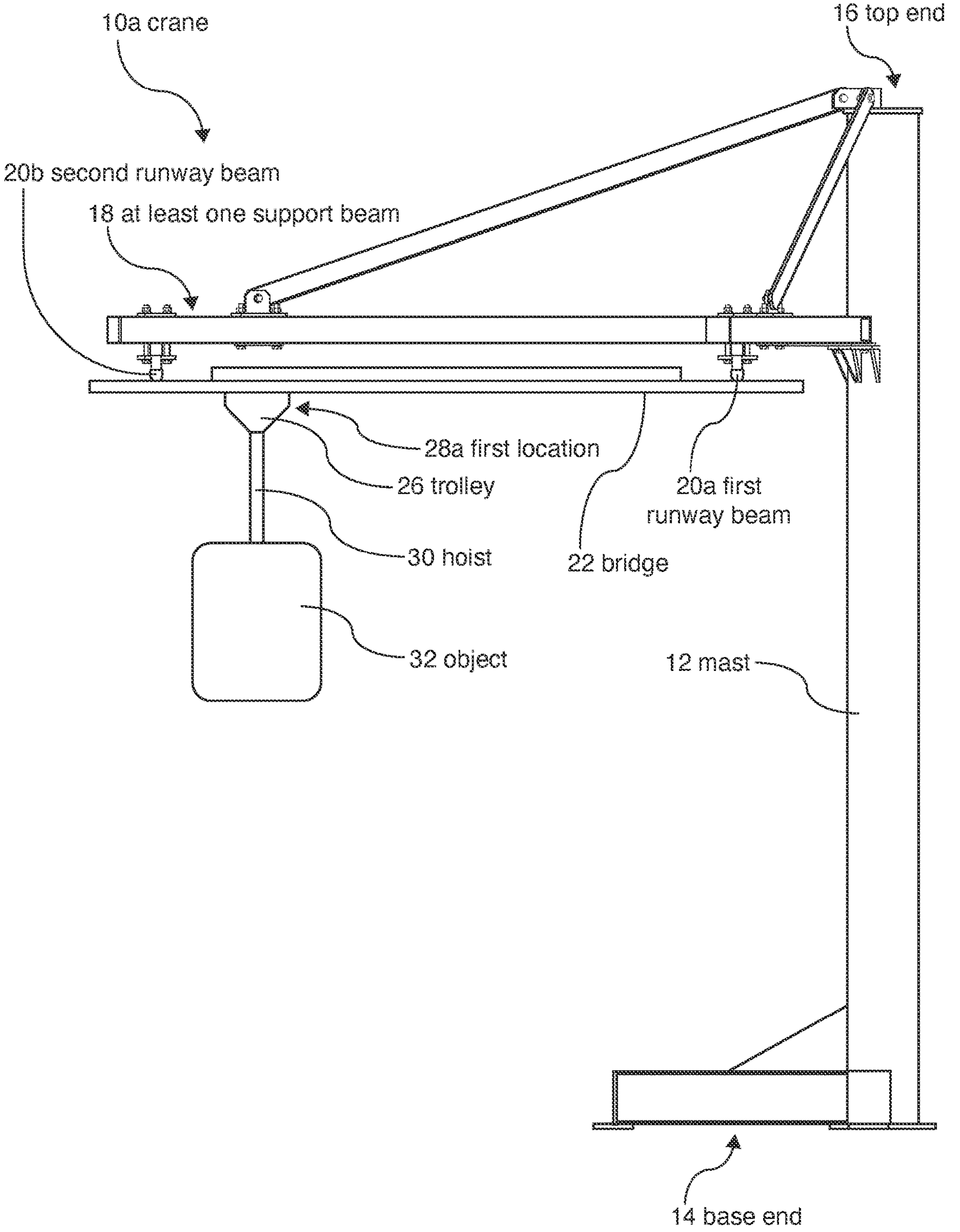
FIGS. 6 and 7 illustrate side views of a crane, according to some embodiments.
Figure 7:
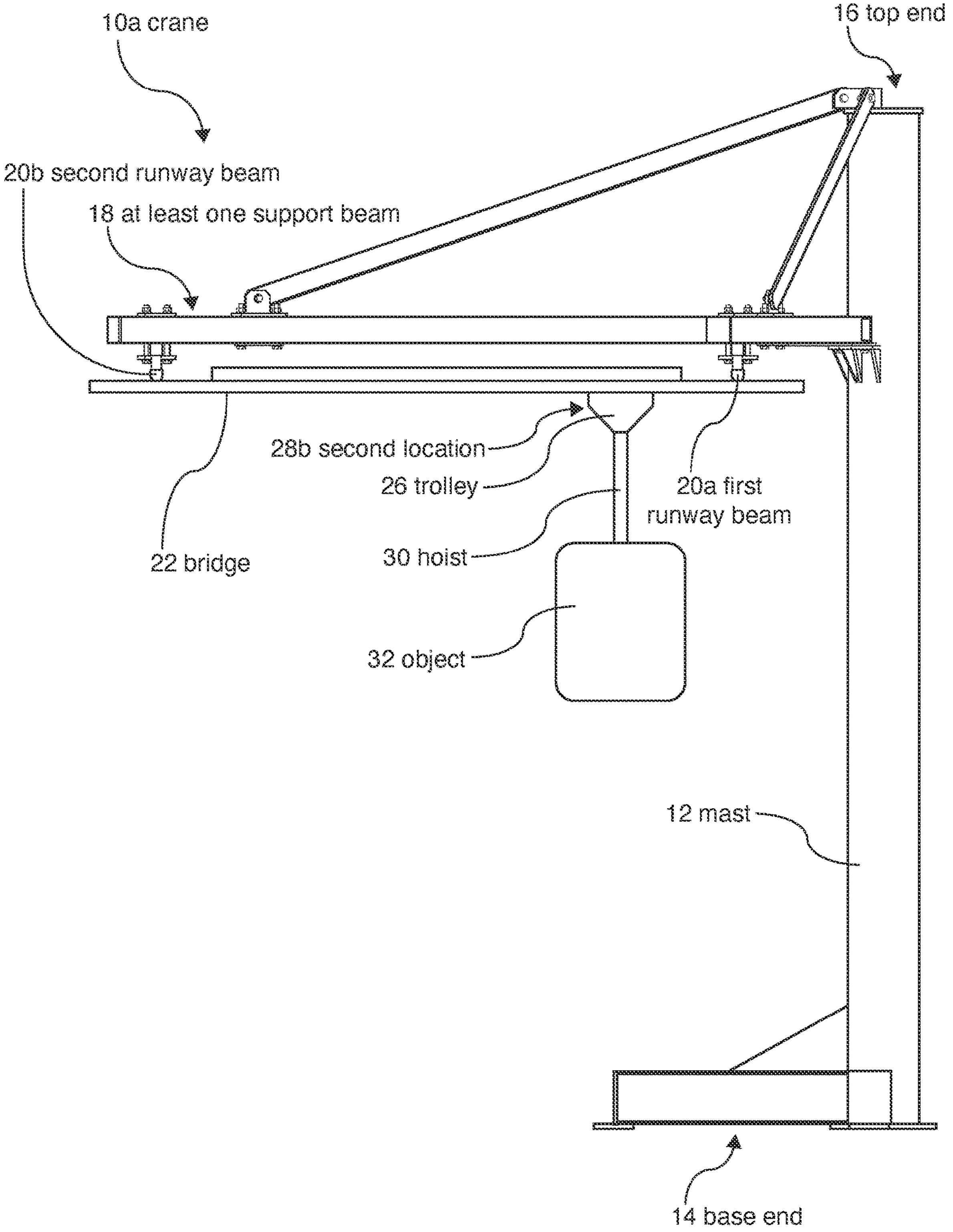

In some embodiments, the trolley 26 is movably coupled to the bridge 22 and is configured to move between a first location and a second location of the bridge 22, as illustrated in FIGS. 6 and 7. The hoist 30 may be coupled to the trolley 26. In some embodiments, the hoist 30 is fixedly coupled to the trolley 26. The hoist 30 may be movably coupled to the trolley 26. In many embodiments, the hoist 30 is configured to lift and lower and object 32 with respect to the trolley 26. The hoist 30 may comprise an extendable and/or retractable cord or similar element.

Figure 2:
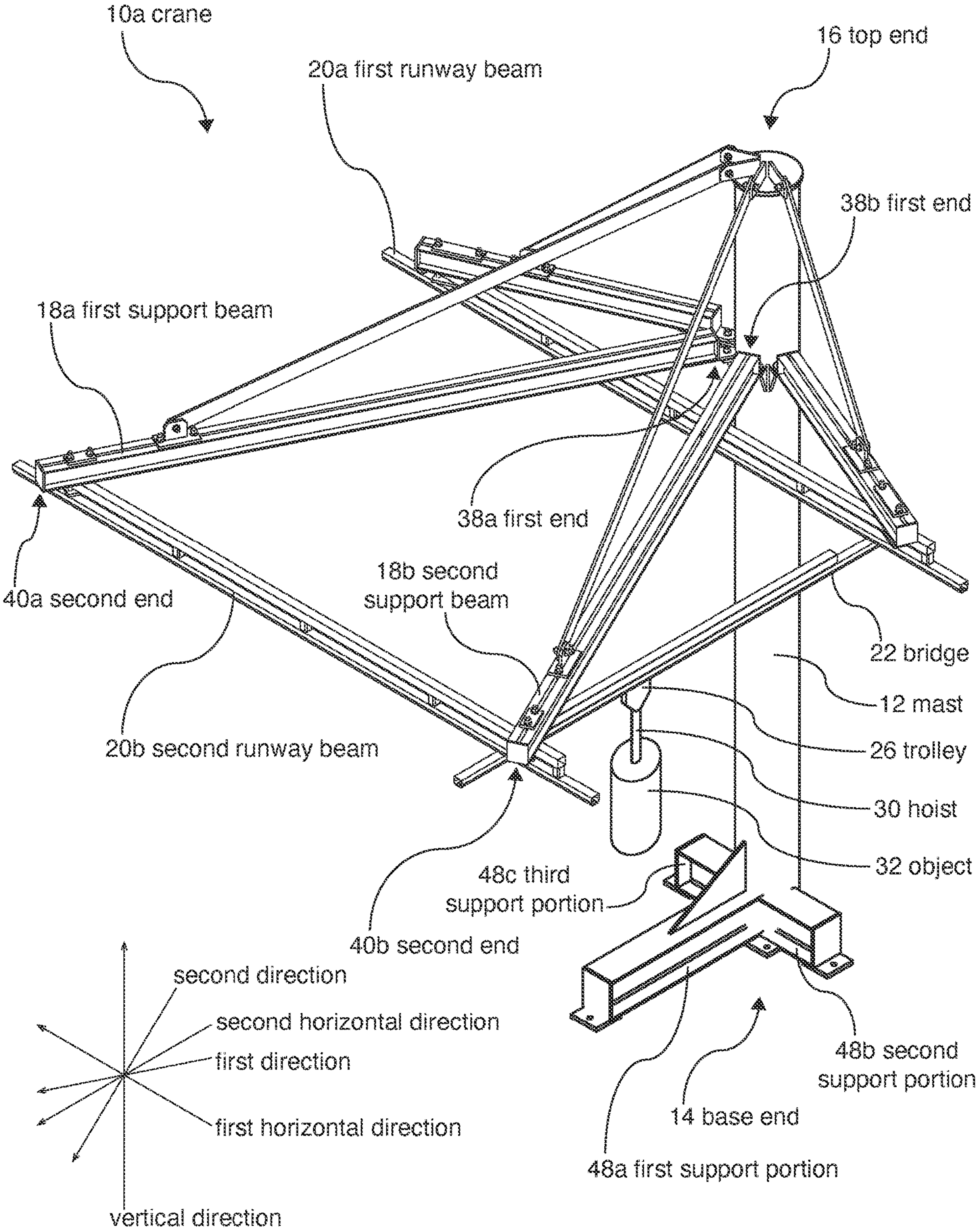

Turning now to FIG. 2, which illustrates a similar crane 10*a* as the crane 10*a* shown in FIG. 1. FIG. 2, however, demonstrates that, in some embodiments, the at least one support beam 18 comprises a first support beam 18*a* and a second support beam 18*b*. As shown, the first support beam 18*a* and the second support beam 18*b* may extend from the mast 12 to the second runway beam 20*b*. In many embodiments, the first support beam 18*a* comprises a first end 38*a* fixedly coupled to the mast 12 near the top end 16 and a second end 40*a* fixedly coupled to the second runway beam 20*b*. Similarly, the second support beam 18*b* may include a first end 38*b* fixedly coupled to the mast 12 near the top end 16 and a second end 40*b* fixedly coupled to the second runway beam 20*b*. In some embodiments, the first support beam 18*a* and the second support beam 18*b* extend to opposite end portions of the second runway beam 20*b*, as illustrated in FIG. 2.

FIG. 2 also includes a directional indicator. In many embodiments, the mast 12 is configured to extend along a vertical direction. The vertical direction may be understood as the direction commonly known as "up." Each of the first and second runway beams 20*a*, 20*b* may be configured to extend along a horizontal direction. In some embodiments, the horizontal direction comprises a first horizontal direction, and the bridge 22 is configured to extend along a second horizontal direction. The first horizontal direction may be perpendicular to the vertical direction, and the second horizontal direction may be perpendicular to both the vertical direction and the first horizontal direction. Also included in the directional indicator are a first and second direction, which correspond to the first support beam 18*a* and the second support beam 18*b*, respectively. Stated differently, in many embodiments, the first support beam 18*a* extends along the first direction and the second support beam 18*b* extends along the second direction.

The base end 14 of the mast 12 may include a first support portion 48*a*, a second support portion 48*b*, and a third support portion 48*c*, as shown in FIG. 2. This configuration of the base end 14 may be referred to as a "three leg I-beam base," though each of the first, second, and third support portions 48*a*, 48*b*, 48*c* may not necessarily comprise I-beams. For example, each of the first, second, and third support portions 48*a*, 48*b*, 48*c* may comprise double c-channel beams or square tube beams. At least one of the first support portion 48*a*, second support portion 48*b*, and third support portion 48*c* may be fixedly coupled to a ground surface. In many embodiments, at least one of the first support portion 48*a*, second support portion 48*b*, and third support portion 48*c* is fixedly coupled to the ground surface via a plurality of bolts, anchors, fasteners, or similar mechanical coupling mechanism. The first support portion 48*a* may extend along a ninth direction perpendicular to the vertical direction. In some embodiments, the second support portion 48*b* extends along a tenth direction and the third support portion 48*c* extends along an eleventh direction, wherein each of the second support portion 48*b* and the third support portion 48*c* extend perpendicular to the vertical direction and the ninth direction. The tenth direction may extend opposite the eleventh direction.

In some embodiments, as shown in FIG. 2, the first support portion 48*a* extends from the mast 12 under the first and second runway beams 20*a*, 20*b*. The first support portion 48*a* may extend under the first and second runway beams 20*a*, 20*b* because, in some embodiments, the crane

10*a* needs structural reinforcement under the runway beams 20*a*, 20*b* in order to sufficiently balance the crane 10*a*, especially when carrying a heavy object 32. The second and third support portions 48*b*, 48*c* may extend to opposite sides of the mast 12, parallel to the first and second runway beams 20*a*, 20*b*. Though not illustrated in the Figures, the crane 10*a* may comprise an additional support portion that extends opposite the first support portion 48*a* such that the additional support portion extends behind the mast 12, on a side of the mast 12 located opposite the side of the mast 12 coupled to the at least one support beam 18 and first runway beam 20*a*. The crane 10*a* may comprise this additional support portion in addition to the first, second, and third support portions 48*a*, 48*b*, 48*c* shown in FIG. 2, or instead of any one or multiple of the first, second, and third support portions 48*a*, 48*b*, 48*c*. The crane 10*a* may comprise more than one additional support portion. The crane 10*a* may not comprise an additional support portion(s) in order to leave a clear walkway behind the crane 10*a*. In many embodiments, the crane 10*a* consists of one mast 12.

Figure 3:
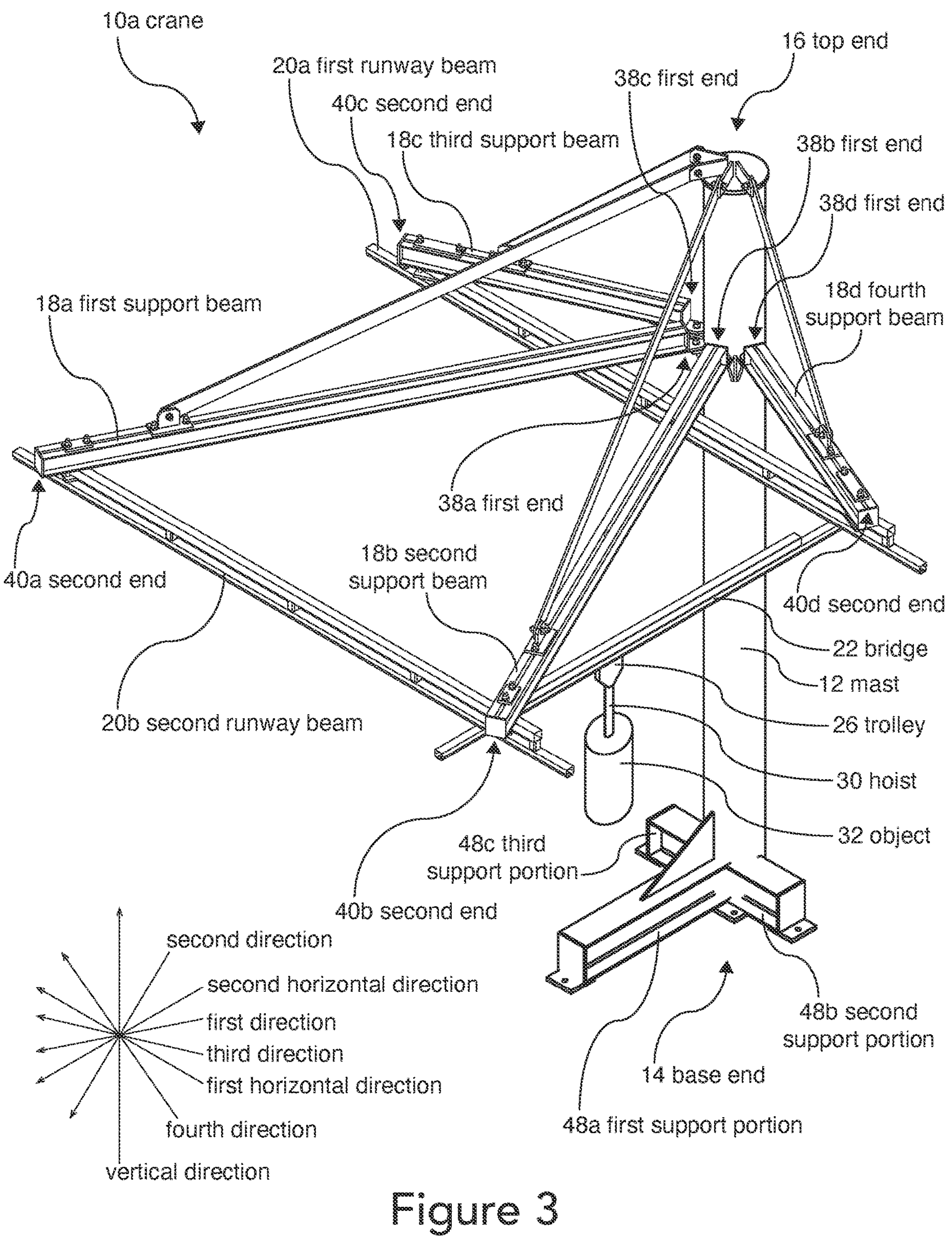

FIG. 3 is similar to FIG. 2, but includes a third support beam 18*c* and a fourth support beam 18*d*. Like the first and second support beams 18*a*, 18*b*, the third and fourth support beams 18*c*, 18*d* couple to the mast 12 and extend to a runway beam. However, rather than extending to the second runway beam 20*b* like the first and second support beams 18*a*, 18*b*, the third and fourth support beams 18*c*, 18*d* extend and couple to the first runway beam 20*a*, as shown in FIG. 3. The third and fourth support beams 18*c*, 18*d*, may extend to opposite end portions of the first runway beam 20*a*, as illustrated. In many embodiments, the third support beam 18*c* extends along a third direction and the fourth support beam 18*d* extends along a fourth direction. Each of the first, second, third, and fourth directions may be perpendicular to the vertical direction. In some embodiments, the third support beam 18*c* comprises a first end 38*c* fixedly coupled to the mast 12 near the top end 16 and a second end 40*c* fixedly coupled to the first runway beam 20*a*. The fourth support beam 18*d* may also comprise a first end 38*d* fixedly coupled to the mast 12 near the top end 16 and a second end 40*d* fixedly coupled to the first runway beam 20*a*. In many embodiments, the at least one support beam 18 shown in FIG. 1 comprises the first, second, third, and fourth support beams 18*a*, 18*b*, 18*c*, 18*d* shown in FIG. 3. The at least one support beam 18 may be fixedly coupled to the mast 12. In some embodiments, the at least one support beam 18 is movably coupled to the mast 12 such that the at least one support beam 18 is configured to rotate about the mast 12.

Figure 4:
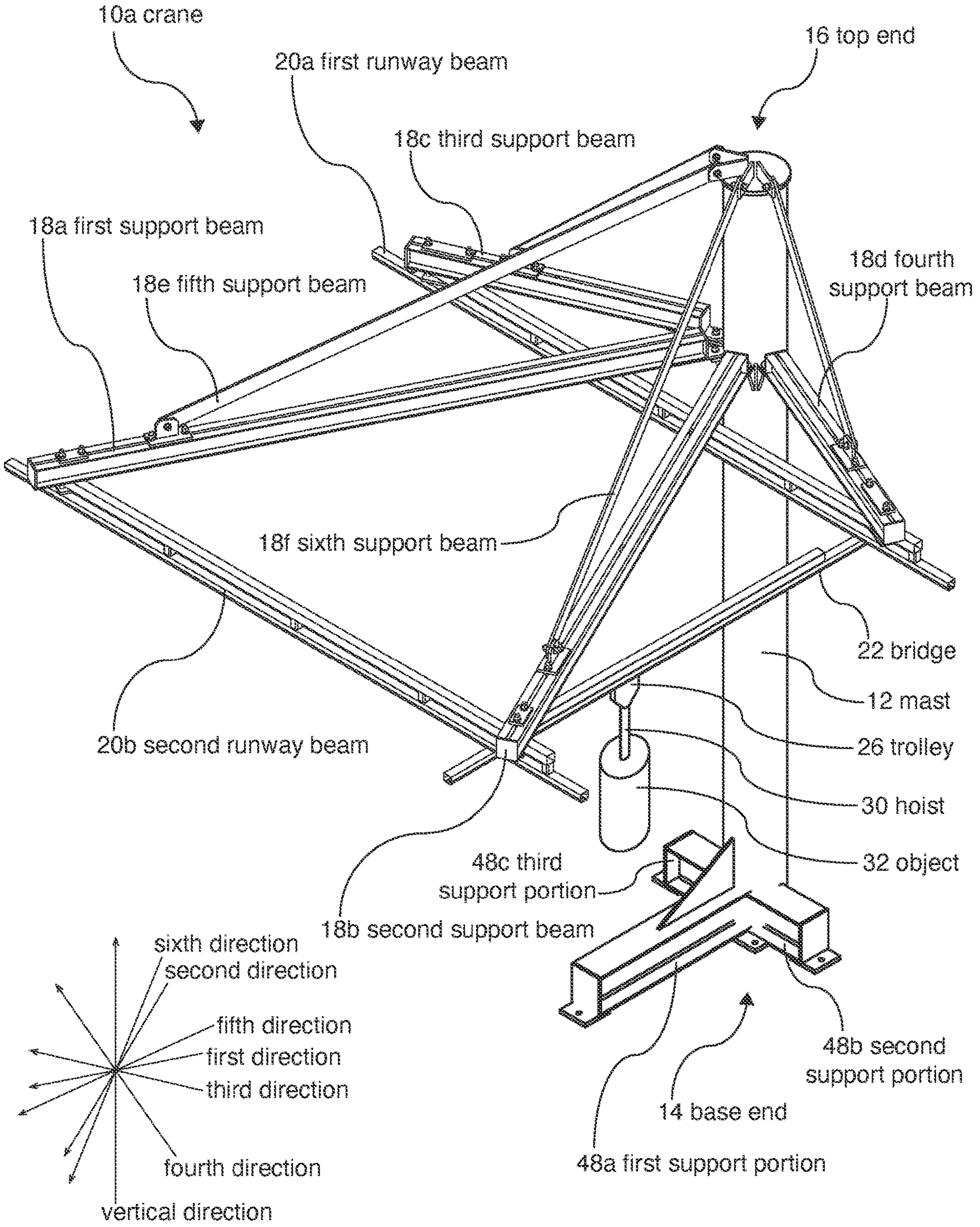

FIG. 4 further identifies elements of the crane 10*a* by including a fifth support beam 18*e* and a sixth support beam 18*f*. In many embodiments, like the first, second, third, and fourth support beams 18*a*, 18*b*, 18*c*, 18*d*, the fifth and sixth support beams 18*e* and 18*f* each comprise a first end fixedly coupled to the mast 12. In contrast to the first, second, third, and fourth support beams 18*a*, 18*b*, 18*c*, and 18*d*, which couple near the top end 16 of the mast 12, the fifth and sixth support beams 18*e*, 18*f* may be fixedly coupled to the top end 16 of the mast 12, as shown in FIG. 4, and may not couple directly to either the first or the second runway beam 20*a*, 20*b*. In some embodiments, the fifth support beam 18*e* extends along a fifth direction from the top end 16 of the mast 12 to the first support beam 18*a*. Similarly, the sixth support beam 18*f* extends along a sixth direction from the top end 16 of the mast 12 to the second support beam 18*b*. The fifth support beam 18*e* may be configured to fixedly couple to the first support beam 18*a* at a location between the first end 38*a* and the second end 40*a* of the first support beam 18*a*. The sixth support beam 18*f* may be configured to fixedly couple to the second support beam 18*b* at a location between the first end 38*b* and the second end 40*b* of the second support beam 18*b*. Stated differently, the fifth and sixth support beams 18*e*, 18*f* may be configured to couple to the first and second support beams 18*a*, 18*b*, respectively, at a location between where each of the first and second support beams 18*a*, 18*b* couples to the mast 12 and where each of the first and second support beams 18*a*, 18*b* couple to the second runway beam 20*b*.

In many embodiments, each of the fifth and sixth support beams 18*e*, 18*f*, is configured to couple to the first and second support beams 18*a*, 18*b*, respectively, closer to a first end 38*a*, 38*b* than a second end 40*a*, 40*b*. The fifth and sixth support beams 18*e*, 18*f* may be configured to couple closer to a first end 38*a*, 38*b* than a second end 40*a*, 40*b*, of the first and second support beams 18*a*, 18*b*. In some embodiments, the location of coupling the fifth and sixth support beams 18*e*, 18*f* to the first and second support beams 18*a*, 18*b*, respectively, is a function of the height of the mast 12, as well as the location along the height of the mast 12 where the first and second. support beams 18*a*, 18*b* are coupled.

For example, if the crane 10*a* shown in FIG. 4 demonstrates a mast height of about ten feet, the first and second support beams 18*a*, 18*b* may be shown coupled to the mast 12 at a height of about eight feet. Now, consider that the mast height is extended to about twelve feet, but the first and second support beams 18*a*, 18*b* remain at the same height of about eight feet. The distance between the coupling location of the first and second support beams 18*a*, 18*b* to the mast 12 and the coupling location of the fifth and sixth support beams 18*e*, 18*f* to the mast 12 has increased from about two feet to about four feet. As a result, the angle of the fifth and sixth support beams 18*e*, 18*f* from the top end 16 to the first and second support beams 18*a*, 18*b* has steepened. In some embodiments, this angle is at least 30 degrees. If the length of each of the fifth and sixth support beams 18*e*, 18*f* is held constant, the fifth and sixth support beams 18*e*, 18*f* may couple to the first and second support beams 18*a*, 18*b* at a location closer to the mast 12 than shown in FIG. 4. In some embodiments, the inverse is true. The distance on the mast 12 between the coupling location of the first and second support beams 18*a*, 18*b* and the coupling location of the fifth and sixth support beams 18*e*, 18*f* may be smaller than demonstrated in FIG. 4, and the fifth and sixth support beams 18*e*, 18*f* may couple closer to the second end 40*a*, 40*b* of the first and second support beams 18*a*, 18*b* than illustrated in FIG. 4. In many embodiments, system and component dimensions, layouts, and capacities are determined using industry standard engineering.

Figure 5:
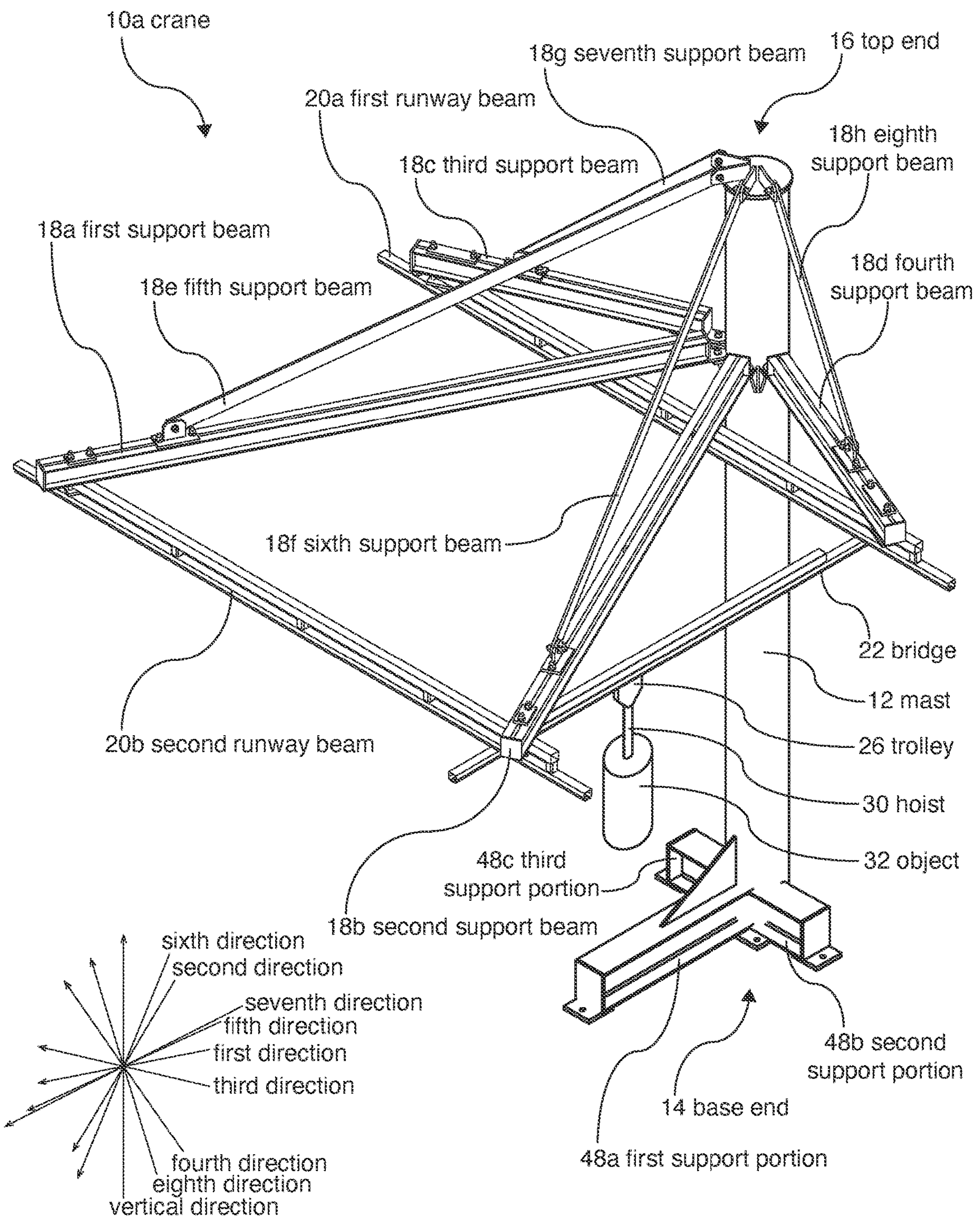

Turning now to FIG. 5, in many embodiments, the crane 10*a* further comprises a seventh support beam 18*g* and an eighth support beam 18*h*. Similar to the fifth and sixth support beams 18*e*, 18*f*, the seventh and eighth support beams 18*g*, 18*h* may be coupled to a top end 16 of the mast 12 and to the at least one support beam 18. In some embodiments, as shown in FIG. 5, the seventh support beam 18*g* is coupled to the top end 16 of the mast 12 and extends to the third support beam 18*c*. The eighth support beam 18*h* may be coupled to the top end 16 of the mast 12 and extend to the fourth support beam 18*d*. In many embodiments, the seventh support beam 18*g* extends along a seventh direction and the eighth support beam 18*h* extends along an eighth direction. The seventh and eighth directions are included in the directional indicator shown in FIG. 5.

Figure 33:
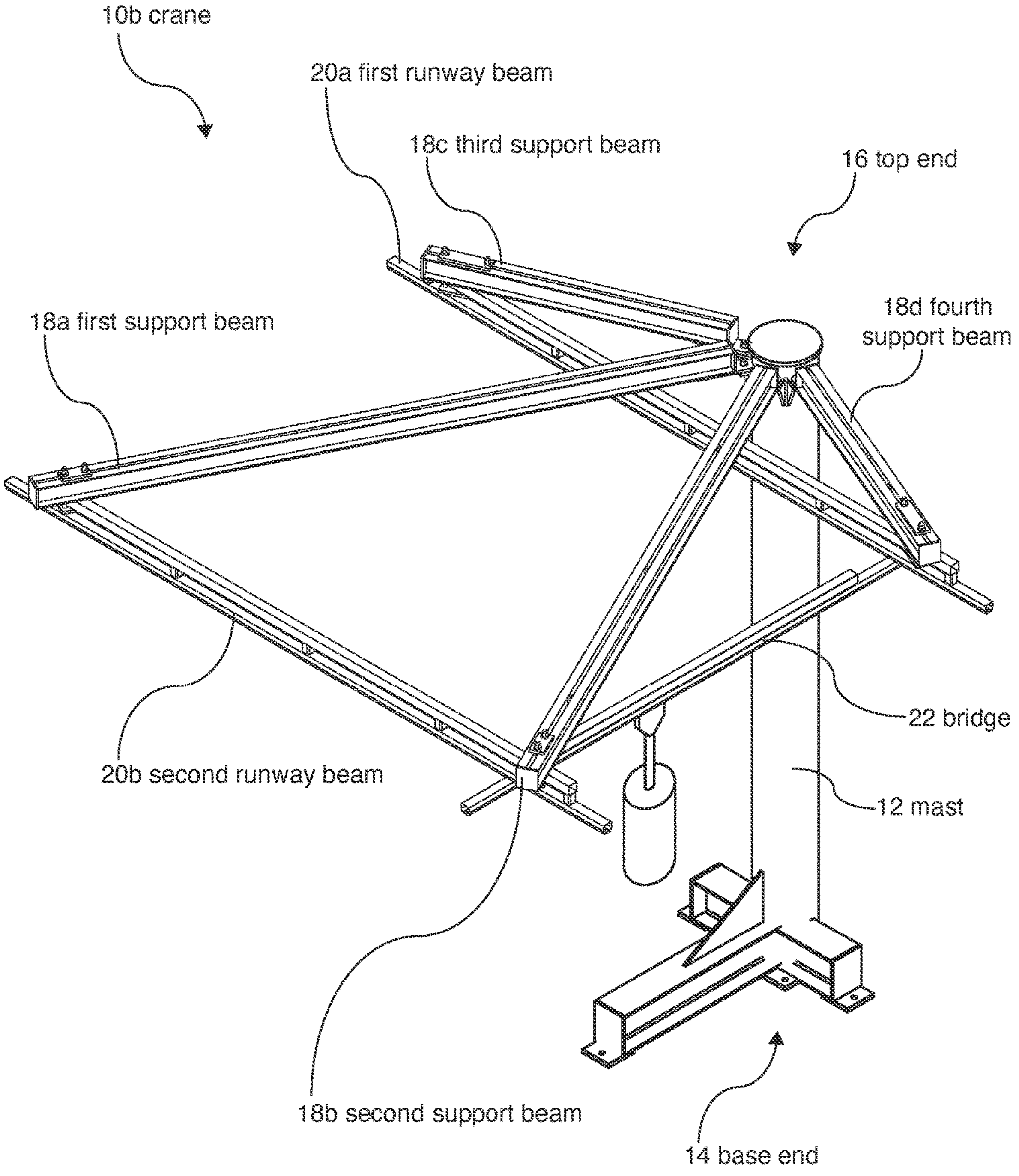
FIG. 33 illustrates a perspective view of a crane, according to some embodiments.

Similar to how the fifth support beam 18*e* couples to the first support beam 18*a* and how the sixth support beam 18*f* couples to the second support beam 18*b*, in some embodiments, the seventh support beam 18*g* is configured to fixedly couple to the third support beam 18*c* at a location between the first end 38*c* and the second end 40*c* of the third support beam 18*c*. Likewise, in some embodiments, the eighth support beam 18*h* is configured to fixedly couple to the fourth support beam 18*d* at a location between the first end 38*d* and the second end 40*d* of the fourth support beam 18*d*. Though FIGS. 1-5 illustrate the crane 10*a* with a total of eight support beams, it should be noted that the crane 10*a* may comprise more than eight support beams. In some embodiments, as shown in FIG. 33, the crane comprises a crane 10*b* with fewer than eight support beams.

It should be noted that though FIGS. 4 and 5 do not include reference labels for the first and second ends of each of the fifth, sixth, seventh, and eighth support beams 18*e*, 18*f*, 18*g*, 18*h*, in many embodiments, the fifth, sixth, seventh, and eighth support beams 18*e*, 18*f*, 18*g*, 18*h* each comprise a first end fixedly coupled to the mast 12 and a second end fixedly coupled to the at least one support beam 18. The reference labels for the first and second ends were not included in FIGS. 4 and 5 for the sake of clarity of the drawings. In some embodiments, the first end of each of the fifth, sixth, seventh, and eighth support beams 18*e*, 18*f*, 18*g*, 18*h* is movably coupled to the mast 12 such that the fifth, sixth, seventh, and eighth support beams 18*e*, 18*f*, 18*g*, 18*h* are configured to rotate about the mast 12.

FIGS. 6 and 7 illustrate side views of a crane 10*a*, including the mast 12, base end 14, top end 16, at least one support beam 18, first runway beam 20*a*, second runway beam 20*b*, and bridge 22. As shown, the trolley 26 may be coupled to the bridge 22. In some embodiments, the trolley 26 is movably coupled to the bridge 22 such that the trolley 26 is configured to travel along the bridge 22. In some embodiments, the trolley 26 rolls, slides, and/or glides along the bridge 22. In some embodiments, the trolley 26 is a wheeled trolley whereby the trolley moves along the bridge via one or more wheels.

For example, FIG. 6 shows the trolley 26 coupled at a first location 28*a* of the bridge 22, while FIG. 7 shows the trolley 26 coupled at a second location 28*b* of the bridge 22. The trolley 26 may be movably coupled to the bridge 22 via at least one wheel or roller, or similar mechanism that enables the trolley 26 to roll along the bridge 22. In some embodiments, the trolley 26 is configured to slide along the bridge 22 with minimal friction. For example, grease or a similar material may be applied to at least one of the trolley 26 and the bridge 22 in order to reduce friction. It should be noted that though FIGS. 6 and 7 illustrate the trolley 26 coupled to a bottom portion of the bridge 22, the trolley 26 may be coupled to a bottom portion and/or a top portion of the bridge 22. In some embodiments, the trolley 26 at least partially surrounds a portion of the bridge 22, such that the bridge 22 is received by the trolley 26. The bridge 22 may at least partially surround the trolley 26, such that the trolley 26 may be received by the bridge 22.

As illustrated in FIGS. 6 and 7, the hoist 30 may be configured to couple the object 32 to the trolley 26. In some embodiments, the hoist 30 is configured to retract and extend to respectively lower and lift the object 32. The trolley 26 may include a winding mechanism configured to wind and unwind the hoist 30. The hoist 30 may comprise an extendable cable, strap, or similar mechanism. In some embodiments, the hoist 30 comprises a coiled and/or spiral cable, strap, or the like. The hoist 30 may comprise a substantially straight (e.g., non-coiled or spiral) strap, cable, or the like. In some embodiments, the hoist 30 is configured to lift an object weighing less than 100 pounds. In some embodiments, the hoist 30 is configured to lift an object weighing 100 pounds or more, such as 5 tons, 10 tons, 50 tons, and the like. Generally, there is no upper limit to what the hoist 30 can lift.

Figure 8:
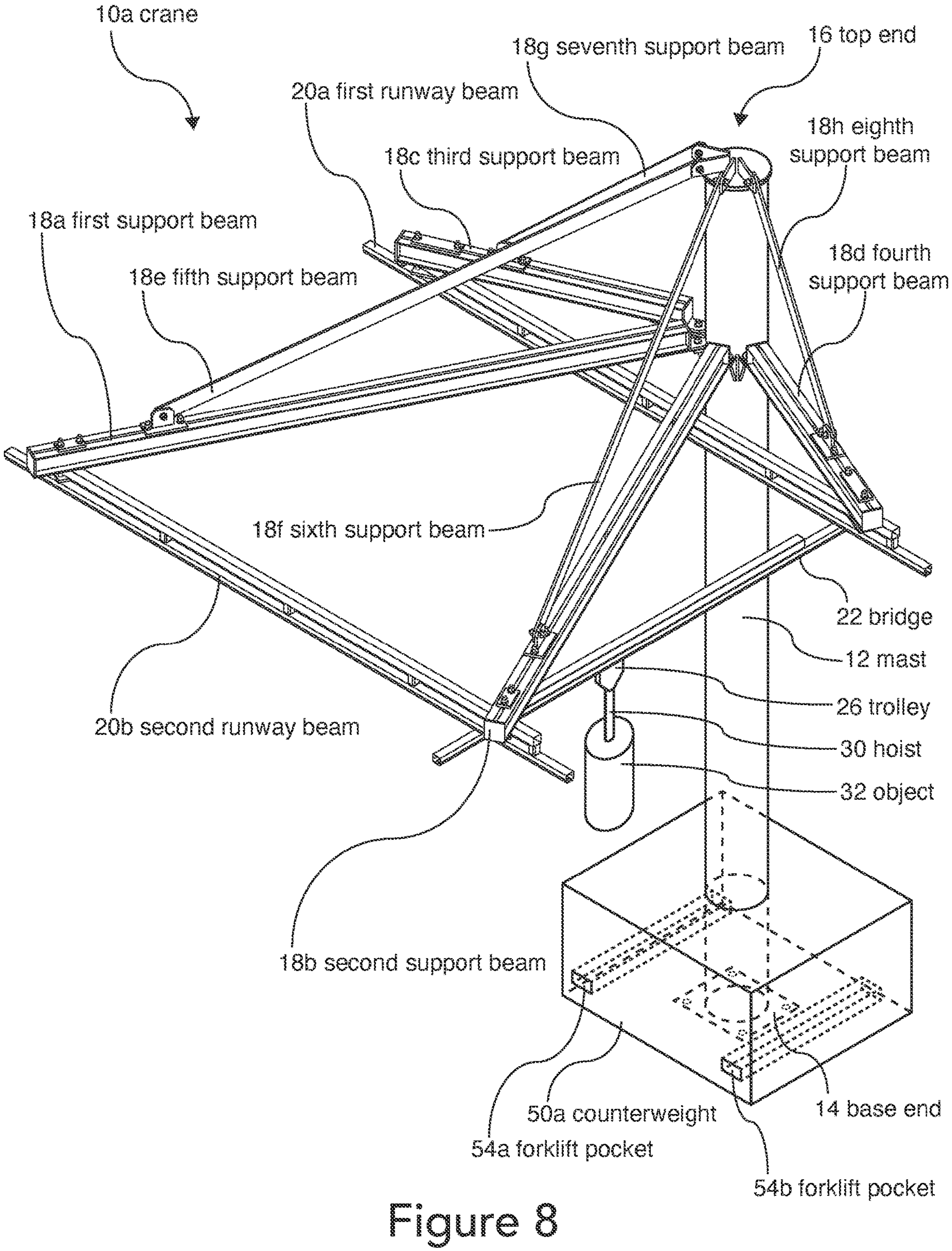
FIGS. 8, 9, and 10 illustrate perspective view of a crane including a counterweight, according to some embodiments.
Figure 9:
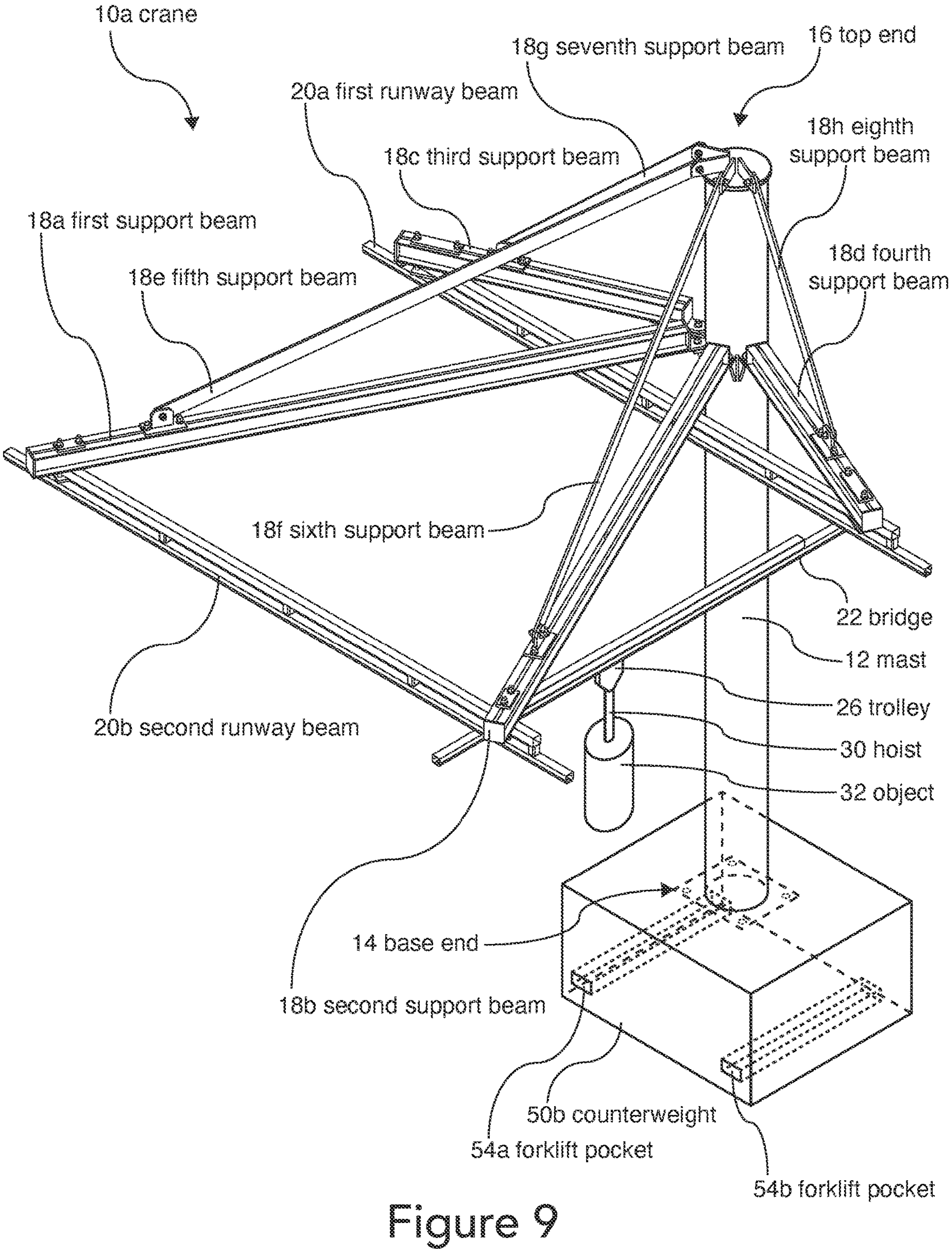
Figure 10:
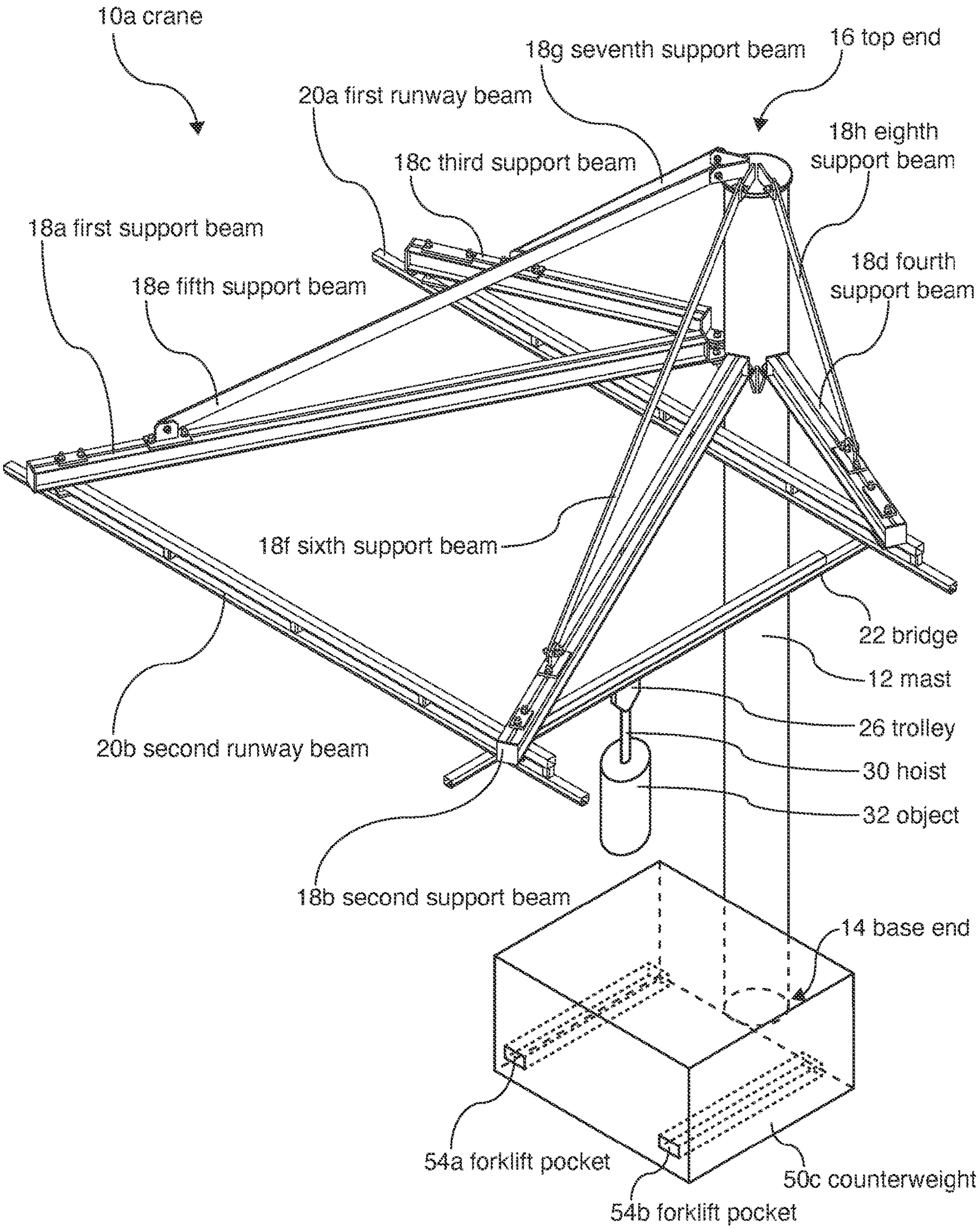

FIGS. 8-10 illustrate embodiments of the crane 10*a* where the base end 14 is coupled to a counterweight 50, rather than comprising the first, second, and third support portions 48*a*, 48*b*, 48*c*, shown in FIGS. 1-5. FIG. 8 demonstrates that, in some embodiments, the base end 14 extends through the counterweight 50*a* and is coupled to a bottom portion of the counterweight 50*a*. Stated differently, the counterweight 50*a* may be configured to receive the base end 14 of the mast 12, as well as part of the length of the mast 12. In contrast, the base end 14 may couple to a top surface of a counterweight 50*b*. as shown in FIG. 9. The base end 14 may also couple to a side and/or corner portion of a counterweight 50*c*, as shown in FIG. 10. In many embodiments, the base end 14 is fixedly coupled to the counterweight 50, which is restably coupled to a ground surface. It should be noted that FIGS. 8-10 show only a few examples of coupling the mast 12 to a counterweight 50, and the illustrated examples are intended to be nonlimiting. In addition, though illustrated as a box-type structure, it should be appreciated that the counterweight 50 may define any suitable shape, such as a cylinder.

The use of a counterweight 50 may enable a user to move the crane 10*a*, such as around a warehouse and/or factory floor. For example, as shown in FIGS. 8-10, the counterweight 50 may include at least one forklift pocket 54. In many embodiments, each forklift pocket 54 is configured to receive one fork of a forklift so that the forklift can lift and/or move the counterweight 50, along with the rest of the crane 10*a*. The at least one forklift pocket 54 may be located on any suitable side and/or surface of the counterweight 50. In some embodiments, the counterweight 50 comprises at least one wheel configured to provide mobility to the crane 10*a*. The counterweight 50 may comprise the at least one wheel in addition to, or instead of, the at least one forklift pocket 54. The counterweight 50 may also facilitate faster installation of the crane 10*a*, as the counterweight 50 does not need to be fixedly coupled to a ground surface, and is instead restably coupled to the ground surface. In contrast, in many embodiments, the base end 14 shown in FIGS. 1-5 does require fixed coupling to the ground surface. In some embodiments, each of the first support portion 48*a*, second support portion 48*b*, and third support portion 48*c* is coupled to the ground surface via at least one mechanical coupling mechanism, such as at least one bolt, anchor, or other similar fastener. Though it may depend on the weight of the object 32, in general, the weight of the counterweight 50 depends on the height, reach, and/or capacity of the crane 10. In some embodiments, the counterweight 50 weighs less than or equal to 4,000 pounds. in some embodiments, the counterweight 50 weighs more than 4,000 pounds. The counterweight 50 may measure about four feet by four feet by two feet.

Figure 11:
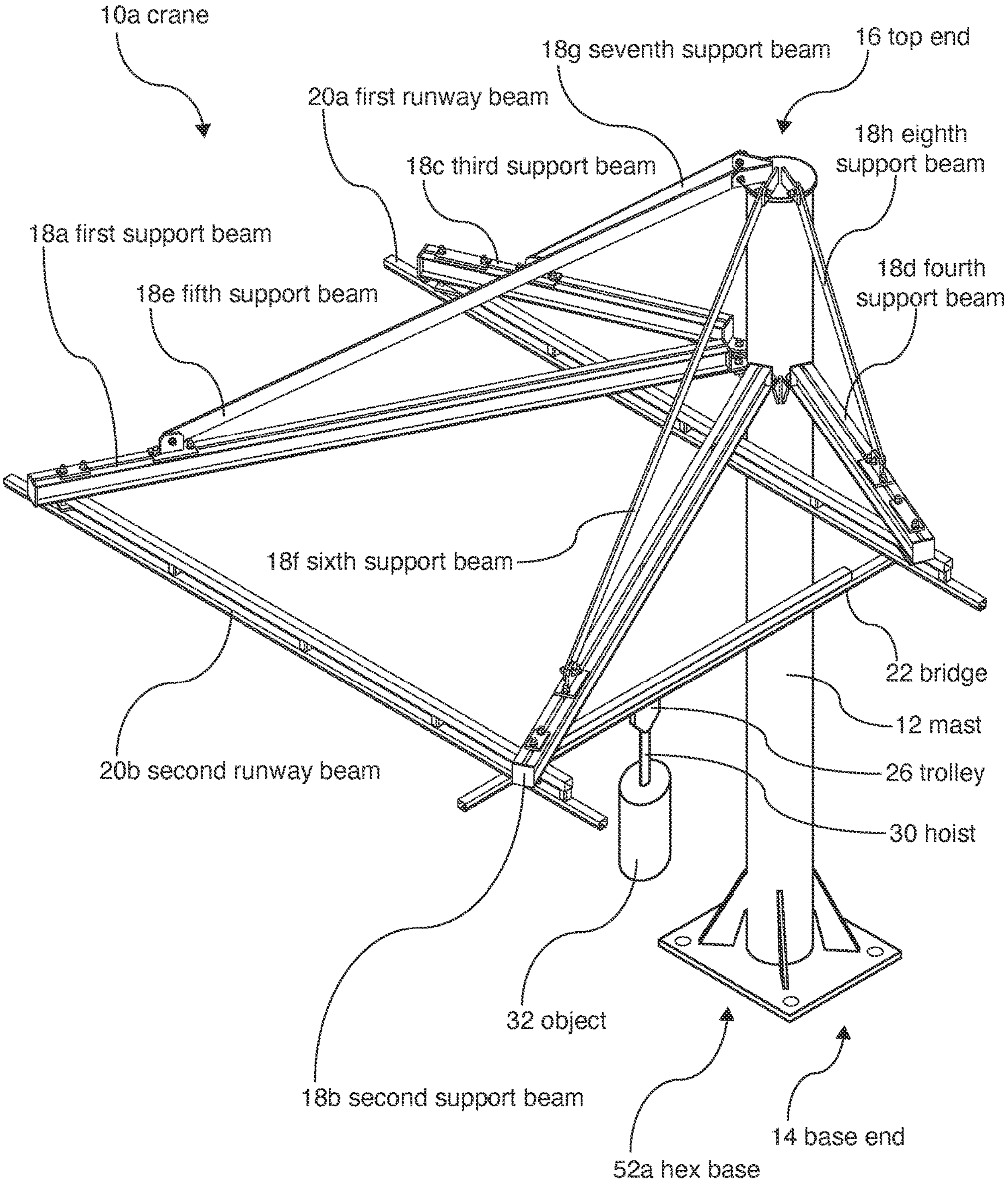
FIGS. 11 and 12 illustrate perspective views of a crane including a hex base, according to some embodiments.
Figure 12:
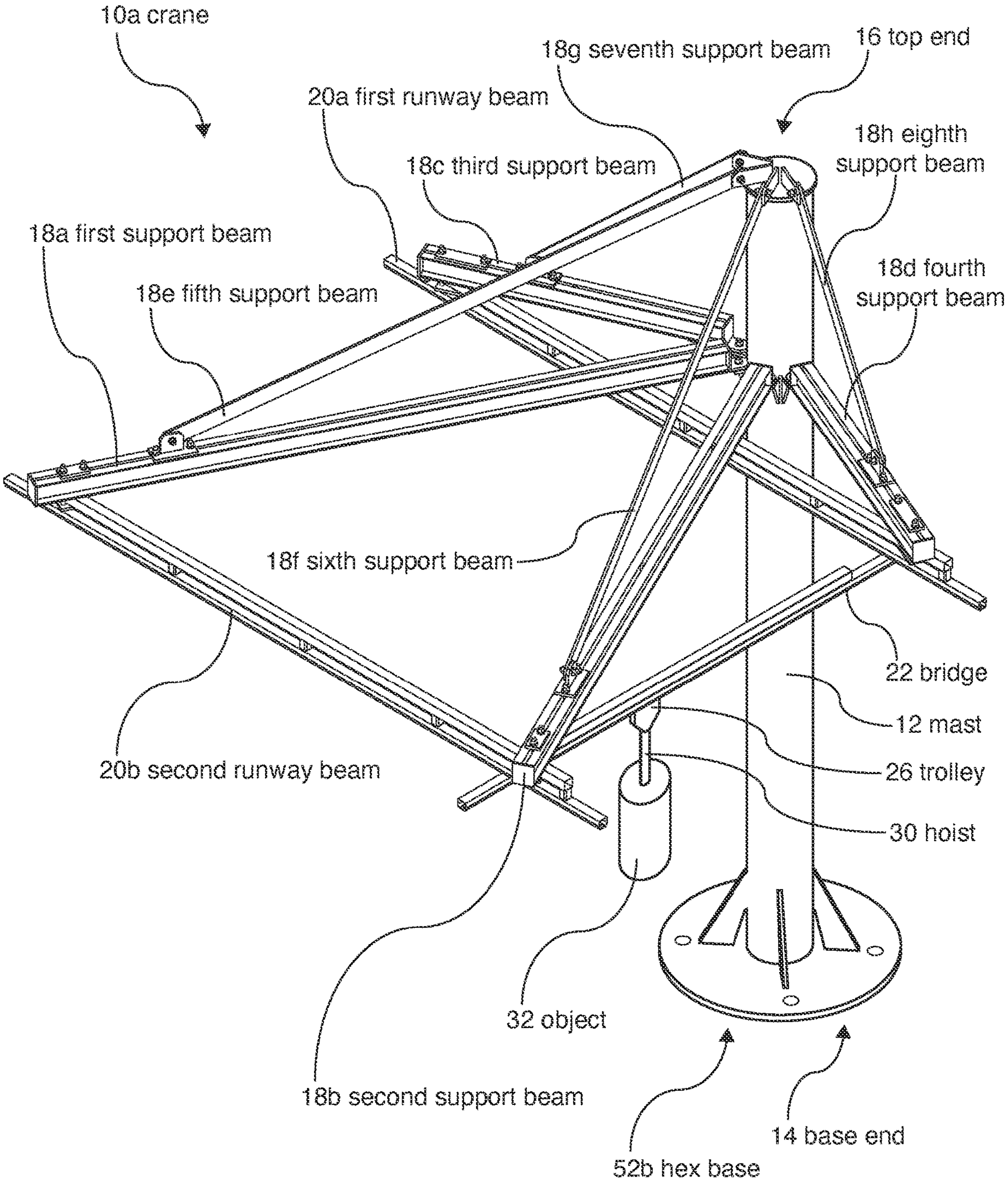

FIGS. 11 and 12 illustrate the crane lira with another embodiment of the base end 14; a hex base 52. FIG. 11 includes a rectangular hex base 52*a*, and FIG. 12 includes a rounded hex base 52*b*. In some embodiments, the hex base 52 comprises a fin type structure that couples the mast 12 to a base portion of the hex base 52. FIGS. 11 and 12 illustrate the hex bases 52*a*, 52*b*, respectively, with three "fins", though the hex base 52*a* and/or the hex base 52*b* may comprise more than three fins. In some embodiments, the hex base 52*a* and/or the hex base 52*b* comprises fewer than three fins. It should be noted that each "fin" of the hex base 52*a*, 52*b* may extend further up the mast 12, toward the top end 16, than illustrated in FIGS. 11 and 12. Each fin of the hex base 52*a*, 52*b* may be shorter than illustrated in FIGS. 11 and 12. In some embodiments, the hex base 52*a*. 52*b* comprises a hollow tube structure configured to receive a portion of the mast 12. Hex bases are commonly used with traditional jib-style cranes and may extend "behind," or from a side of the mast located opposite the jib arm of, a traditional jib crane. In many embodiments, the hex base 52*a*, 52*b* is fixedly coupled to a ground surface via a plurality of mechanical coupling mechanisms, such as bolts, anchors, fasteners, or the like. The hex base 52*a*, 52*b* may require a greater number of and/or larger mechanical coupling mechanisms than the three leg I-beam base shown in FIGS. 1-5.

Figure 13:
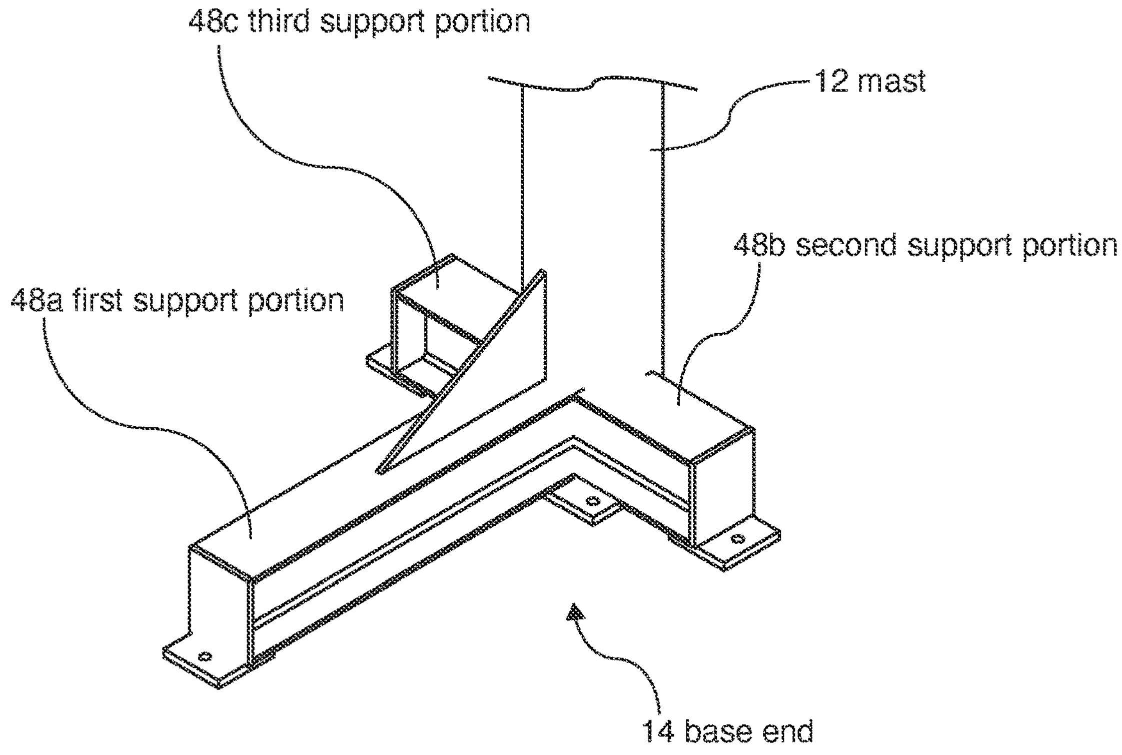
FIGS. 13, 14, 15, 16, 17, and 18 illustrate close up views of different bases of a crane, according to some embodiments.

FIGS. 13-18 illustrate close-up views of the base ends 14 included in the previous Figures. FIG. 13 shows the base end 14 comprising the three leg I-beam base, including the first, second, and third support portions 48*a*, 48*b*, 48*c*. The base end 14 may comprise more than three support portions. In some embodiments, the base end 14 comprises fewer than three support portions. For example, the base end 14 may comprise two support portions that extend from the mast 12 in a "V" shape. In some embodiments, the base end 14 of the mast 12 comprises at least one support portion extending along a twelfth direction, wherein the at least one support portion defines a length directly related to a capacity of the crane 10*a*. Stated differently, the at least one support portion may define a length sufficient to balance the crane 10*a* at a given capacity. In some embodiments, the at least one support portion defines a length sufficient to balance the crane 10*a* without the need to fixedly couple the at least one support portion to a ground surface. In many embodiments, the base end 14 illustrated in FIG. 13 is not configured to support a traditional jib crane. A traditional jib crane may have a greater range of motion in the jib arm than the range of motion of the at least one support beam 18 of the crane 10*a*. Accordingly, due to the reduced range of motion, the crane 10*a* may require less support than a traditional jib crane.

Figure 14:
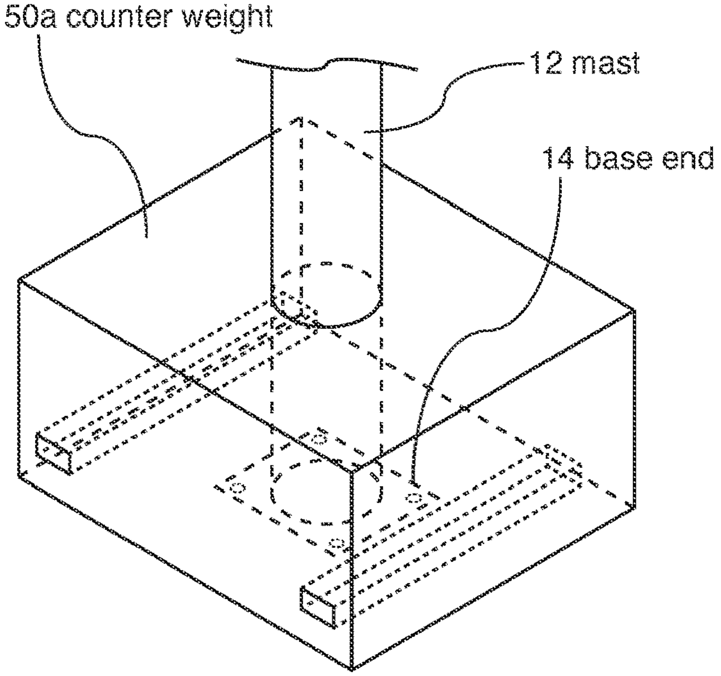
Figure 15:
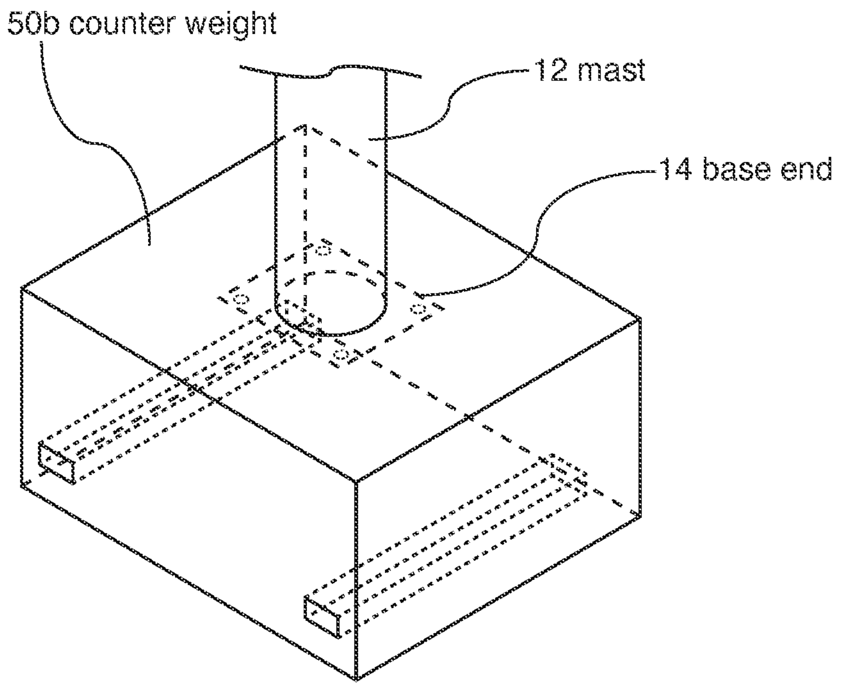
Figure 16:
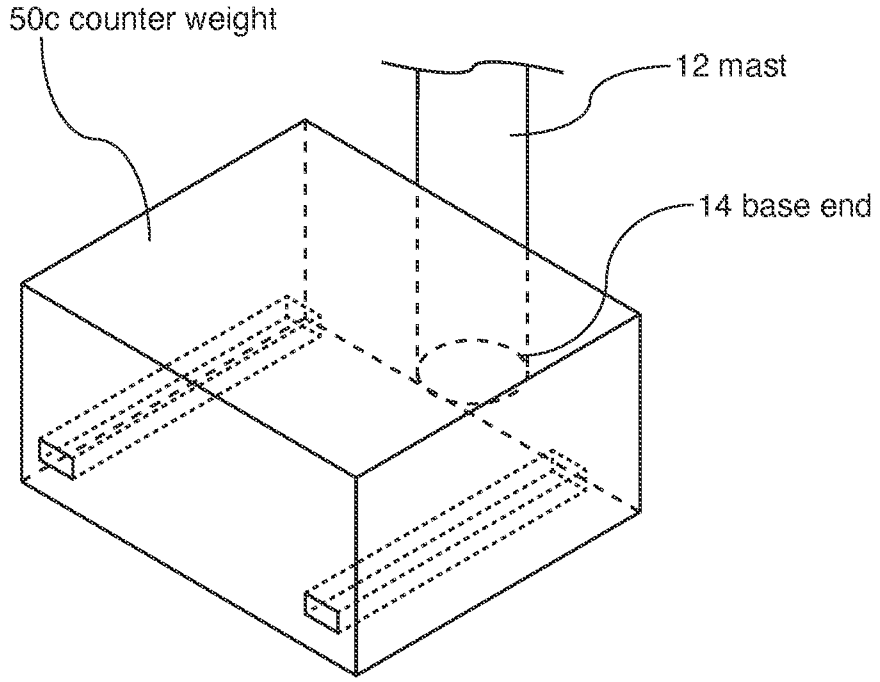

FIGS. 14, 15, and 16 illustrate the base end 14 of the mast 12 coupled to a counterweight 50, as shown in FIGS. 8, 9, and 10, respectively. As previously discussed, the base end 14 may be configured to couple to the counterweight 50 in a variety of locations, including an interior bottom portion of the counterweight 50*a*, as shown in FIG. 14, a top portion of the counterweight 50*b*, as shown in FIG. 15, and a side portion of the counterweight 50*c*, as shown in FIG. 16. The base end 14 may be configured to couple to a corner of the counterweight 50. Coupling the mast 12 to a side and/or corner of the counterweight 50 may require less weight than coupling the mast 12 to a top surface of the counterweight 50. Stated differently, the counterweight 50*b* shown in FIG. 15 may require more weight than the counterweight 50*c* shown in FIG. 16 in order to counterbalance the crane 10*a*. Coupling the mast 12 to a side and/or corner of the counterweight 50 may also require less weight than coupling the mast 12 to a bottom portion of the counterweight 50*a*, as shown in FIG. 14. Though illustrated with at least one forklift pocket 54 in FIGS. 8-10, in some embodiments, the counterweight 50 does not include at least one forklift pocket 54, as shown in FIGS. 14-16. The counterweight 50 may include at least one wheel or similar mechanism to enable the counterweight to move across a ground surface.

Figure 17:
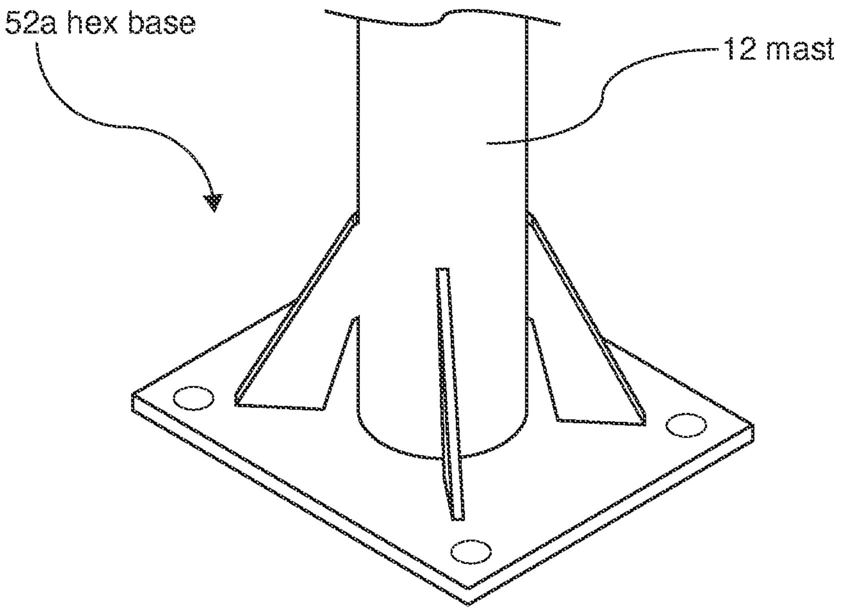
Figure 18:
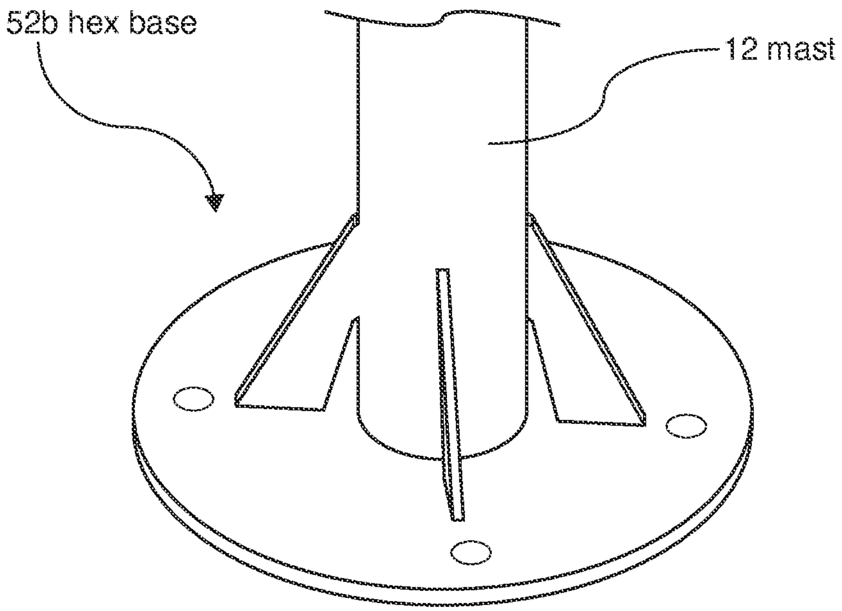

FIGS. 17 and 18 show the hex bases 52*a*, 52*b* included in FIGS. 11 and 12. As previously discussed, the hex base 52 may include a rectangular base portion, like the hex base 52*a*, or a rounded base portion, like the hex base 52*b*. Hex bases are commonly used for traditional jib cranes, and also may be used to couple the crane 10*a* of this disclosure to a ground surface. The bases shown in FIGS. 13-18 represent only a few examples of possible bases for the crane 10*a*.

Figure 19:
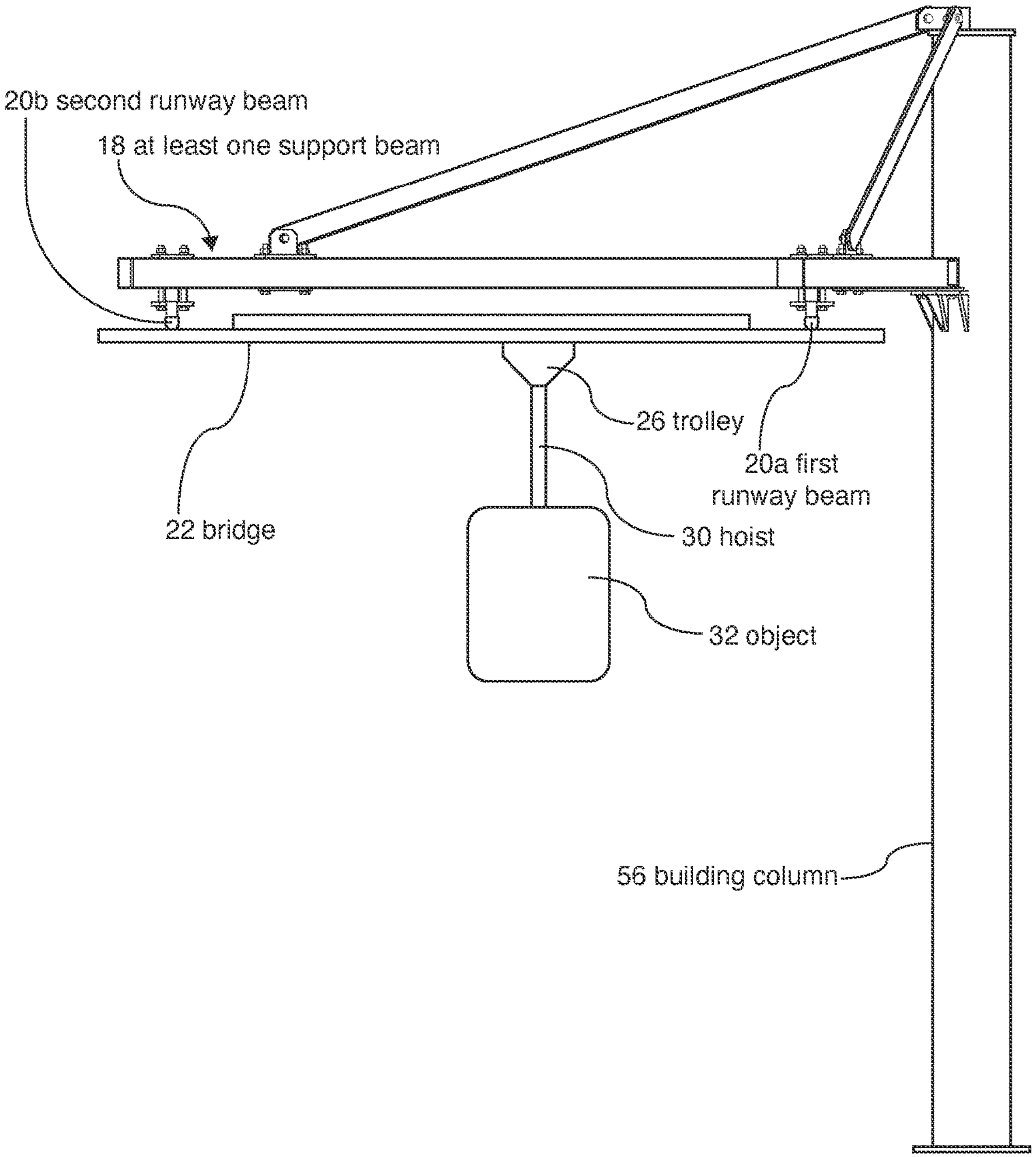
FIG. 19 illustrates a side view of a crane coupled to a building column, according to some embodiments.

FIG. 19 shows another embodiment of a crane, where the at least one support beam 18 is coupled to a building column 56 rather than a mast 12, as shown in the previous Figures. Like the other embodiments, FIG. 19 includes the first and second runway beams 20*a*, 20*b*, as well as the bridge 22 coupled to the trolley 26, which is coupled to the object 32 via the hoist 30. FIG. 19 also includes upper support beams in addition to the at least one support beam 18. It should be noted that the "upper support beams" refer to the support beams similar to the fifth, sixth, seventh, and eighth support beams 18*e*, 18*f*, 18*g*, 18*h* shown in FIG. 5. The upper support beams may also be referred to as "struts." The upper support beams may be configured to couple to a face of the building column 56. In some embodiments, when the crane is coupled to a building column 56, the upper support beams are not required. The upper support beams may be needed when the crane is coupled to the building column 56. In some embodiments, the at least one support beam 18 and the upper support beams, if present, are movably coupled to the building column 56. The at least one support beam and the upper support beams, if present, may be fixedly coupled to the building column 56. The building column 56 may comprise a pipe column, a rectangle column, a fabricated I-beam column, or any suitable column type known to a person having ordinary skill in the art. In some embodiments, the crane is configured to couple to a flat building wall, rather than a building column.

Figure 20:
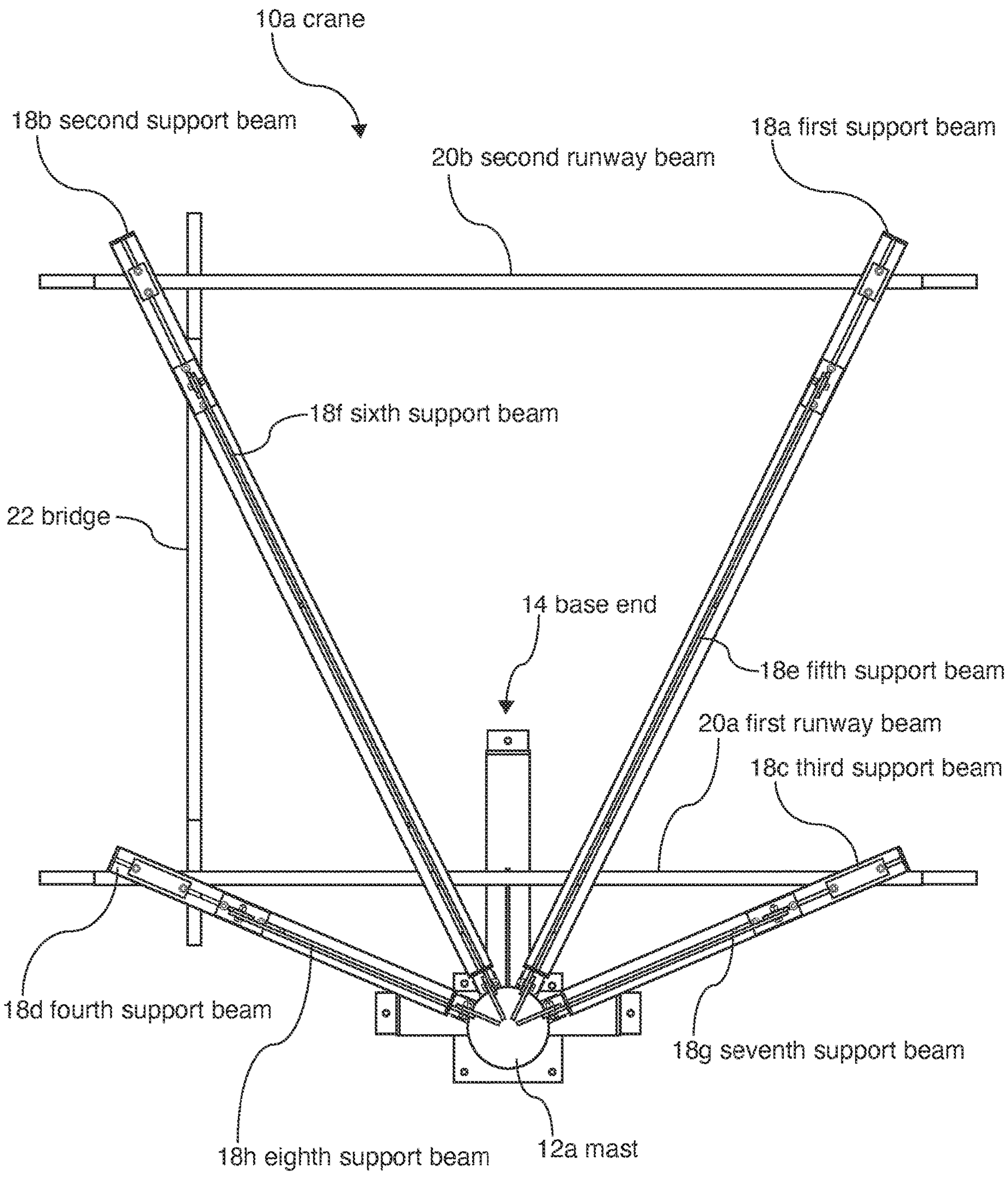
FIGS. 20, 21, 22, and 23 illustrate top views of a crane, according to some embodiments.
Figure 21:
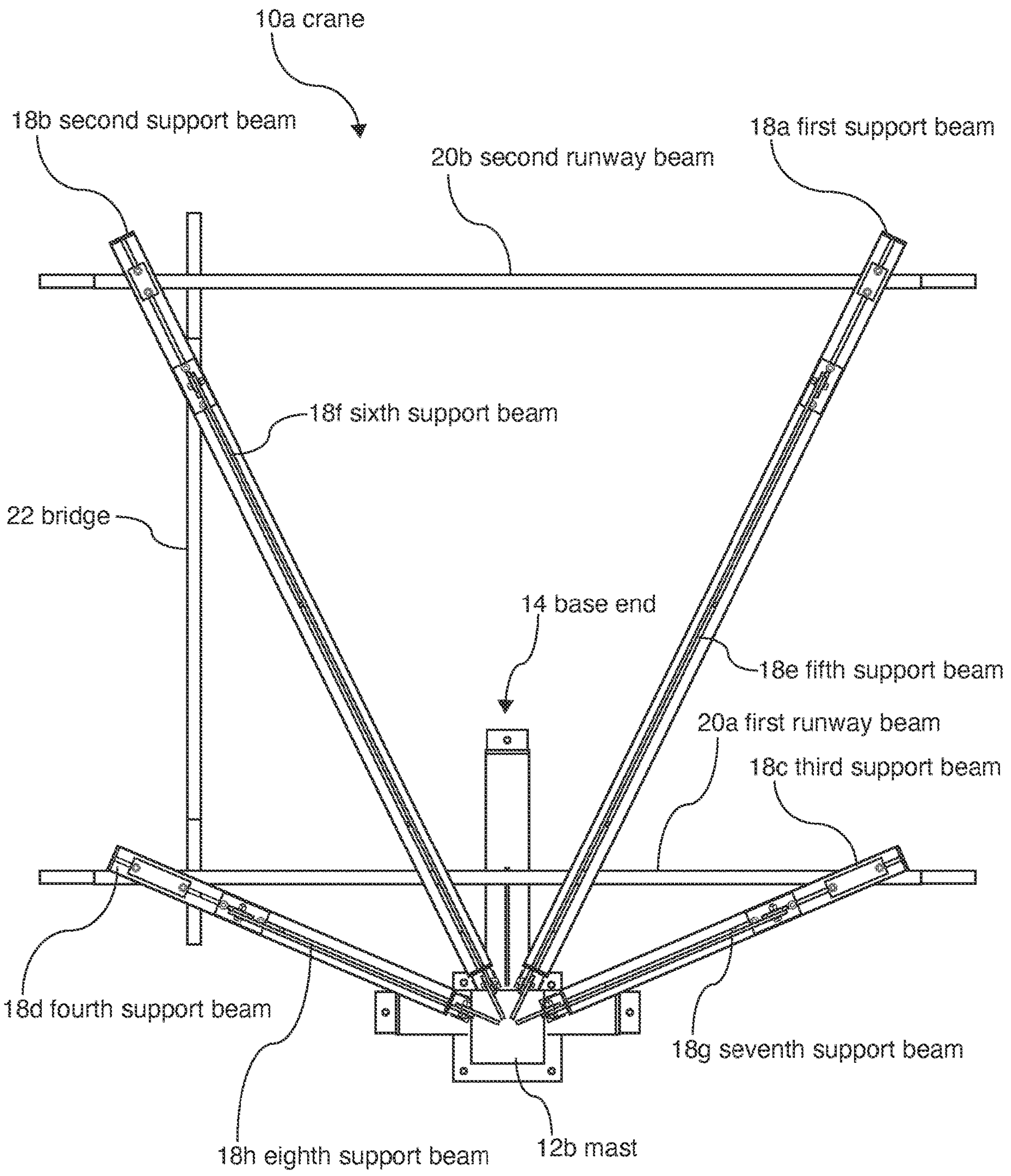
Figure 22:
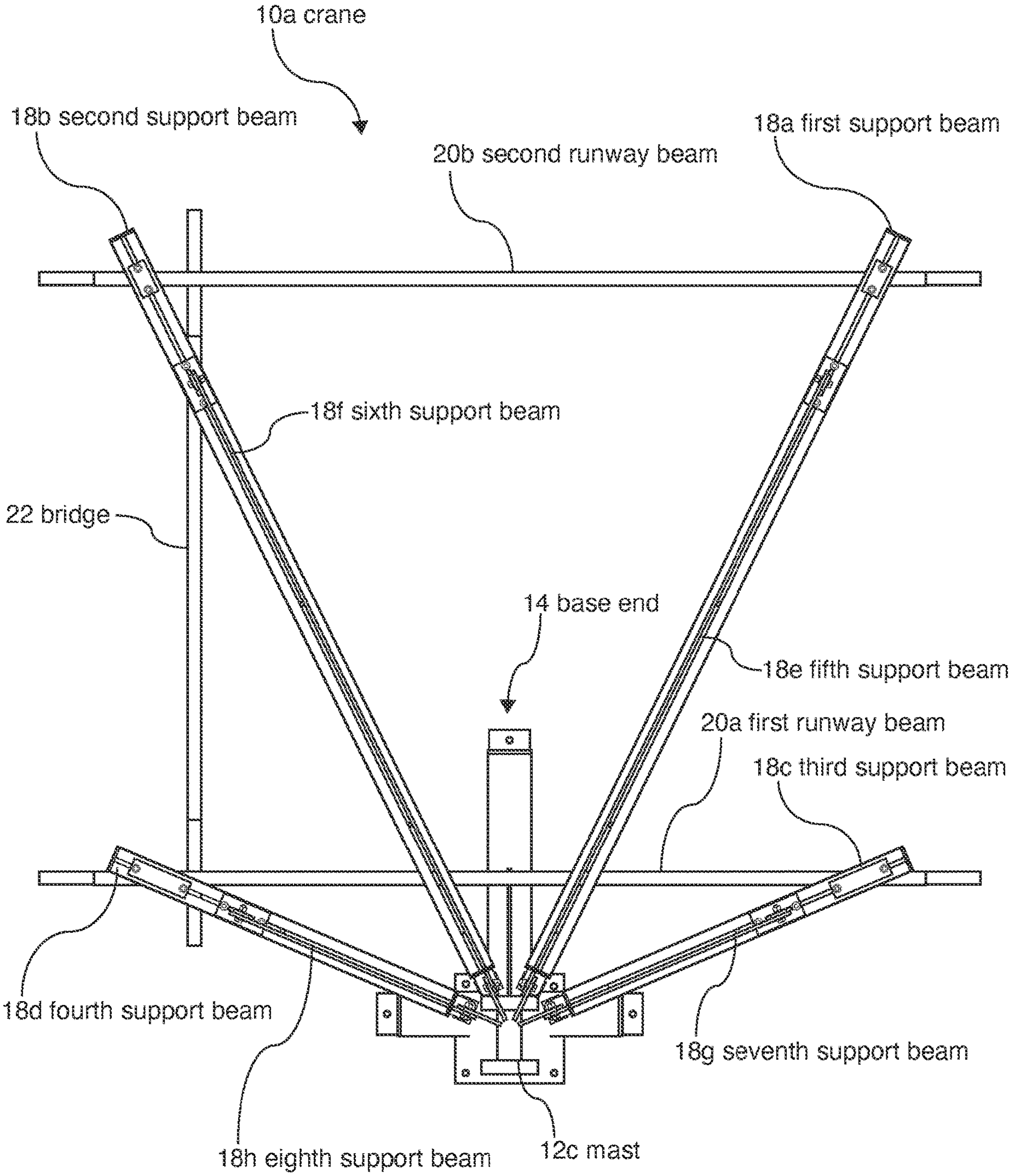
Figure 23:
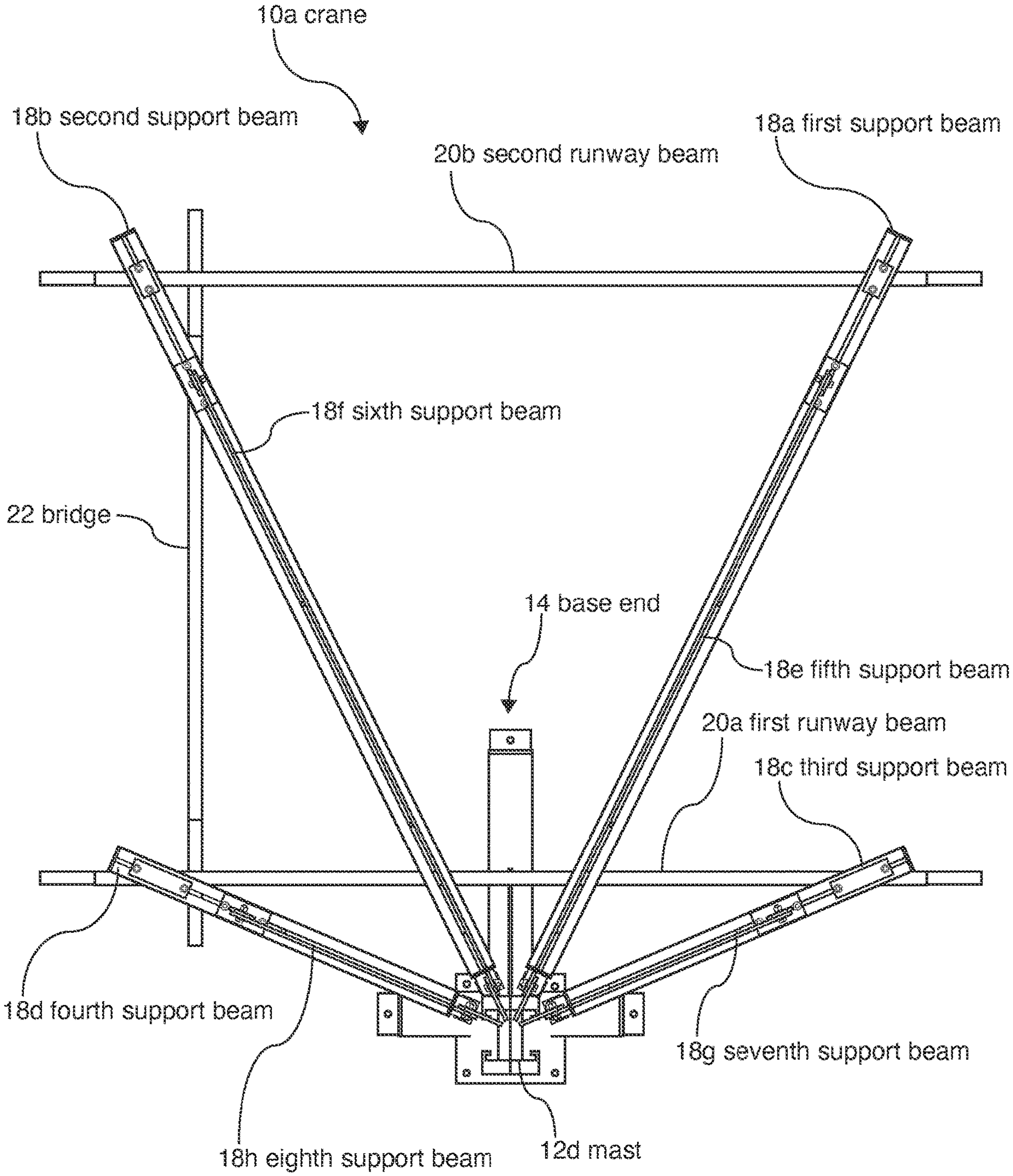
Figure 24:
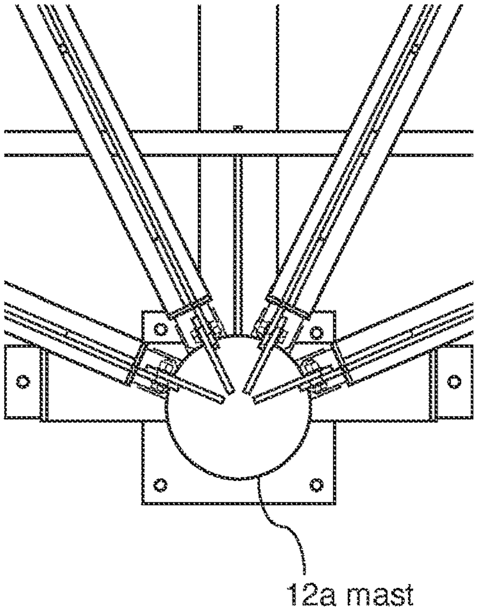
FIGS. 24, 25, 26, and 27 illustrate close up top views of different masts of a crane, according to some embodiments.
Figure 25:
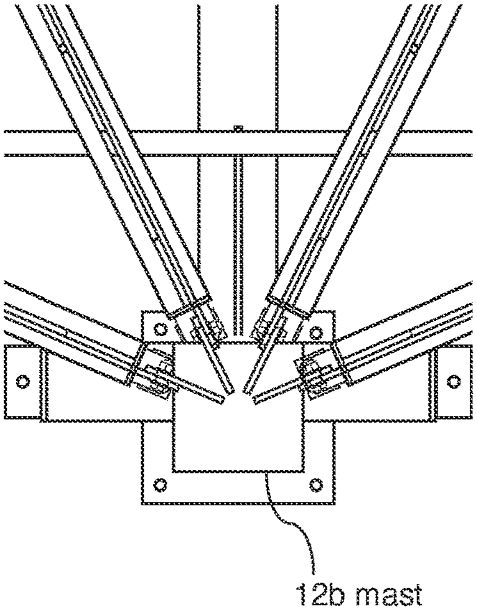
Figure 26:
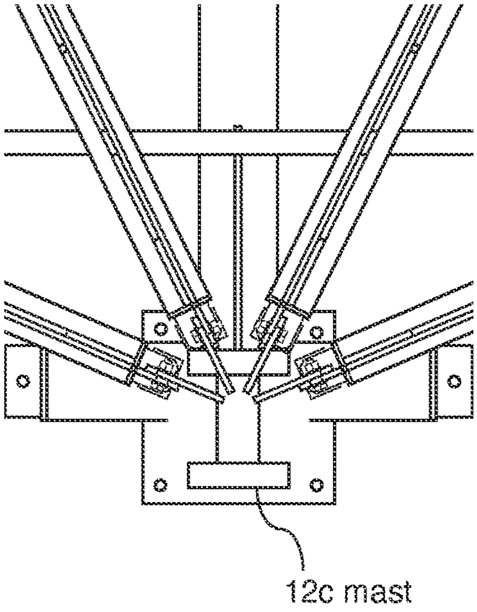
Figure 27:
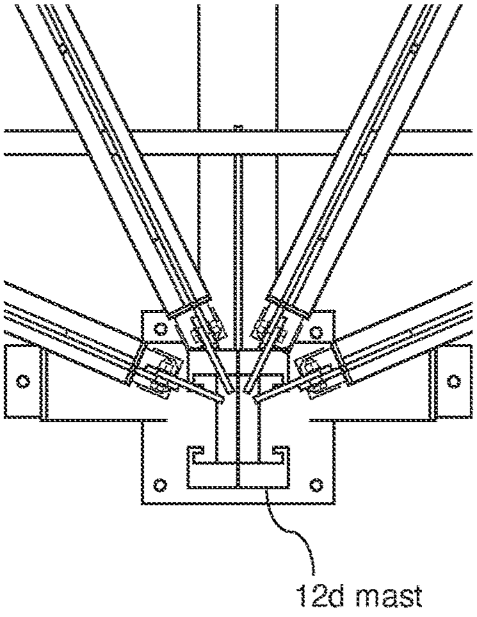

FIGS. 20-23 illustrate top views of different embodiments of the crane 10*a*. In many embodiments, the crane 10*a* comprises a free-standing column, the mast 12, as shown in FIGS. 1-18 and 20-23. The mast 12 may comprise different types of column as indicated in FIGS. 20-23. For example, FIG. 20 illustrates the mast 12*a* comprising a round pipe column. A round pipe column may be the most common type of mast 12 for the crane 10*a*, as well as for other types of cranes, such as a traditional jib crane and a traditional workstation crane. In some embodiments, the diameter of the pipe column is a function of the height, reach, and capacity of the crane. The crane 10*a* shown in FIG. 20 may include an 8" diameter mast 12*a*. A traditional jib crane may include a smaller column, for example, a 6" diameter mast. The traditional jib crane may also require a taller column than the mast 12*a* of the crane 10*a*. Accordingly, in many embodiments, the crane 10*a* comprises a shorter, but larger diameter, mast 12*a* than a traditional jib crane. The larger diameter may be needed to provide sufficient support to the runway beams 20*a*, 20*b*, the bridge 22, the at least one support beam 18, and the upper support beams. It should. be noted that the example diameters used in this disclosure are included for example only, and are nonlimiting examples of possible diameters of columns. FIG. 21 illustrates another type of mast 12*b*, where the mast 12*b* comprises a rectangular tube column. In some embodiments, the rectangular tube column comprises a square tube column. The rectangular tube column may comprise a non-square rectangular column. In some embodiments, as shown in FIG. 22, the mast 12*c* comprises an I-beam column. The mast 12*d* may also comprise a fabricated double c-channel column, as illustrated in FIG. 23.

At least one of the round pipe column and the rectangular tube column may be stronger than at least one of the I-beam column and the double c-channel column. In some embodiments, the crane 10*a* is compatible with any of the round pipe column, the rectangular tube column, the I-beam column, and the double c-channel column. In contrast, a traditional jib crane may not be configured to couple to at least one of the I-beam column and the double c-channel column, as a traditional jib crane produces too much twisting to the column when the jib arm rotates, reaches the stop point, and bounces back during use. The crane 10*a*, even when movably coupled to either a free-standing (round pipe, rectangular tube, I-beam, double c-channel columns) or building column, may produce less twisting upon rotation. Accordingly, the crane 10*a* may be enabled to carry a larger capacity than a traditional jib crane when coupled to the same type of column. Further, the crane 10*a* may be enabled to carry a larger capacity than a traditional jib crane even when the traditional jib crane is coupled to a "stronger" column. For example, the crane 10*a* coupled to an I-beam column may be enabled to carry a larger capacity than a traditional jib crane coupled to a round pipe column or a building column.

FIGS. 24-27 illustrate close up views of each of the masts 12*a*, 12*b*, 12*c*, and 12*d* shown in FIGS. 20-23, respectively. It should be noted that though each of FIGS. 20-27 illustrates the crane 10*a* including the upper support beams/struts, in some embodiments, with some types of columns, the upper support beams/struts are not required. The ability to forego the upper support beams will be discussed further with reference to FIG. 33.

Figure 28:
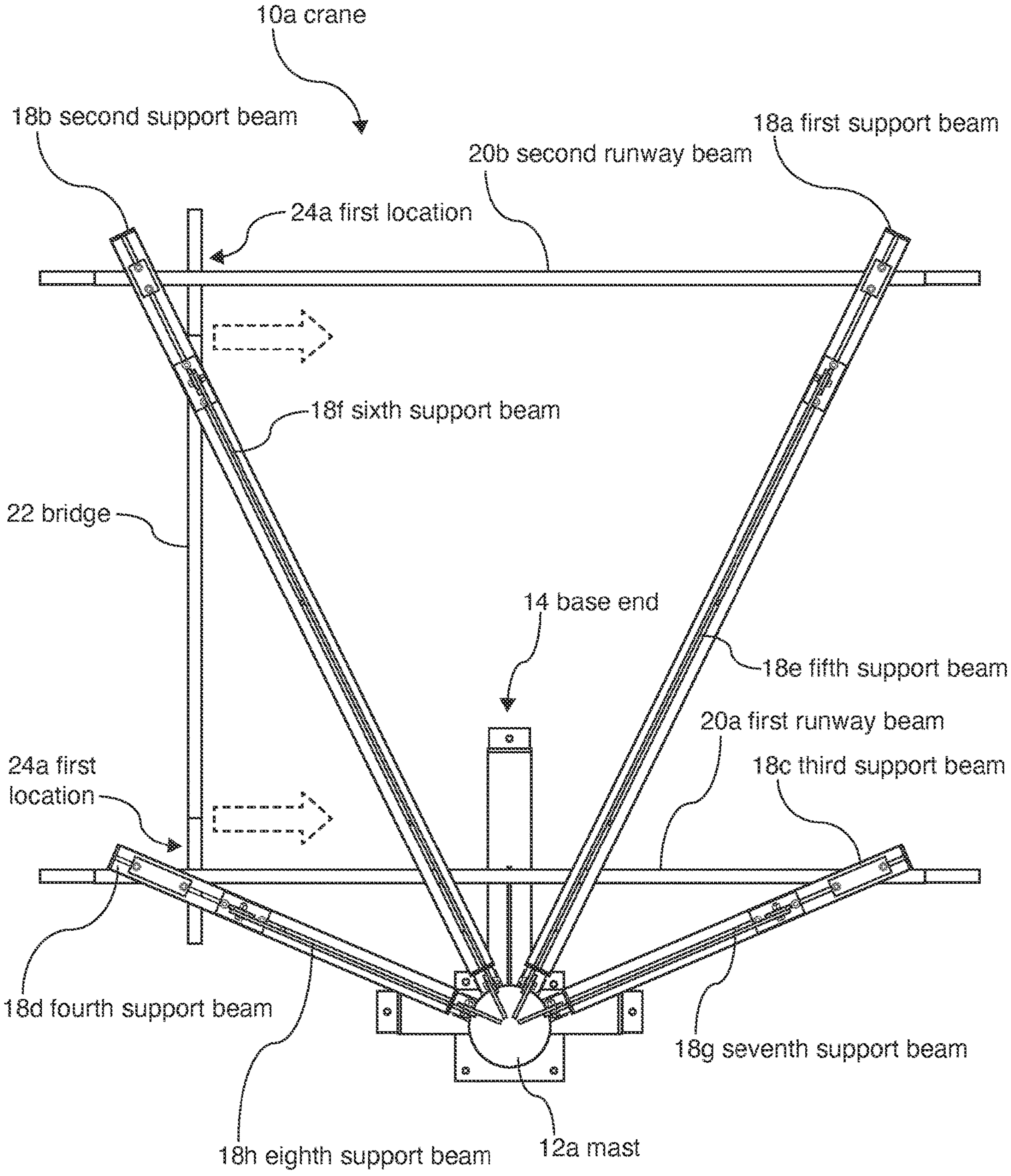
FIGS. 28, 29, 30, and 31 illustrate top views of a crane including a movable bridge, according to some embodiments.
Figure 29:
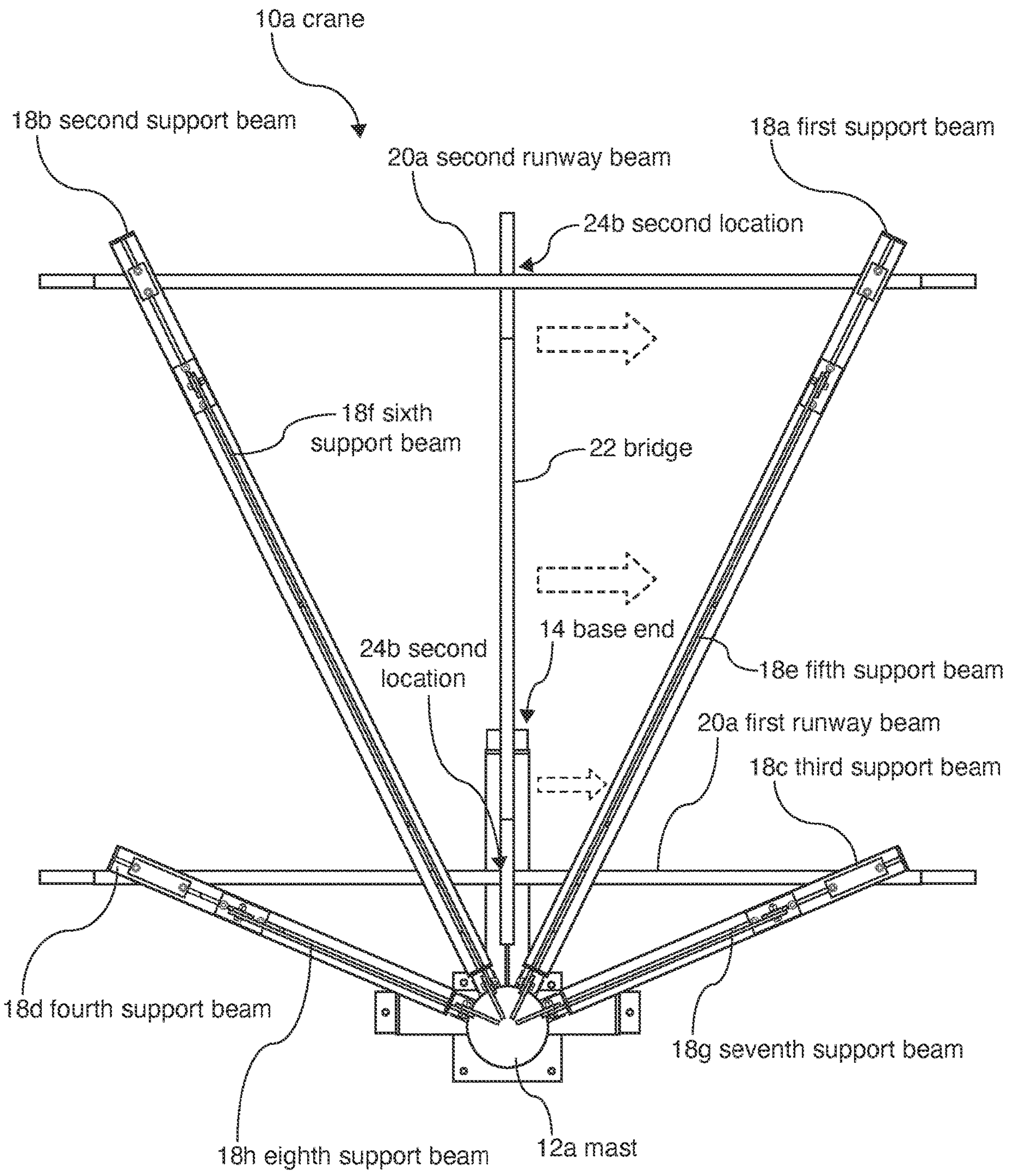
Figure 30:
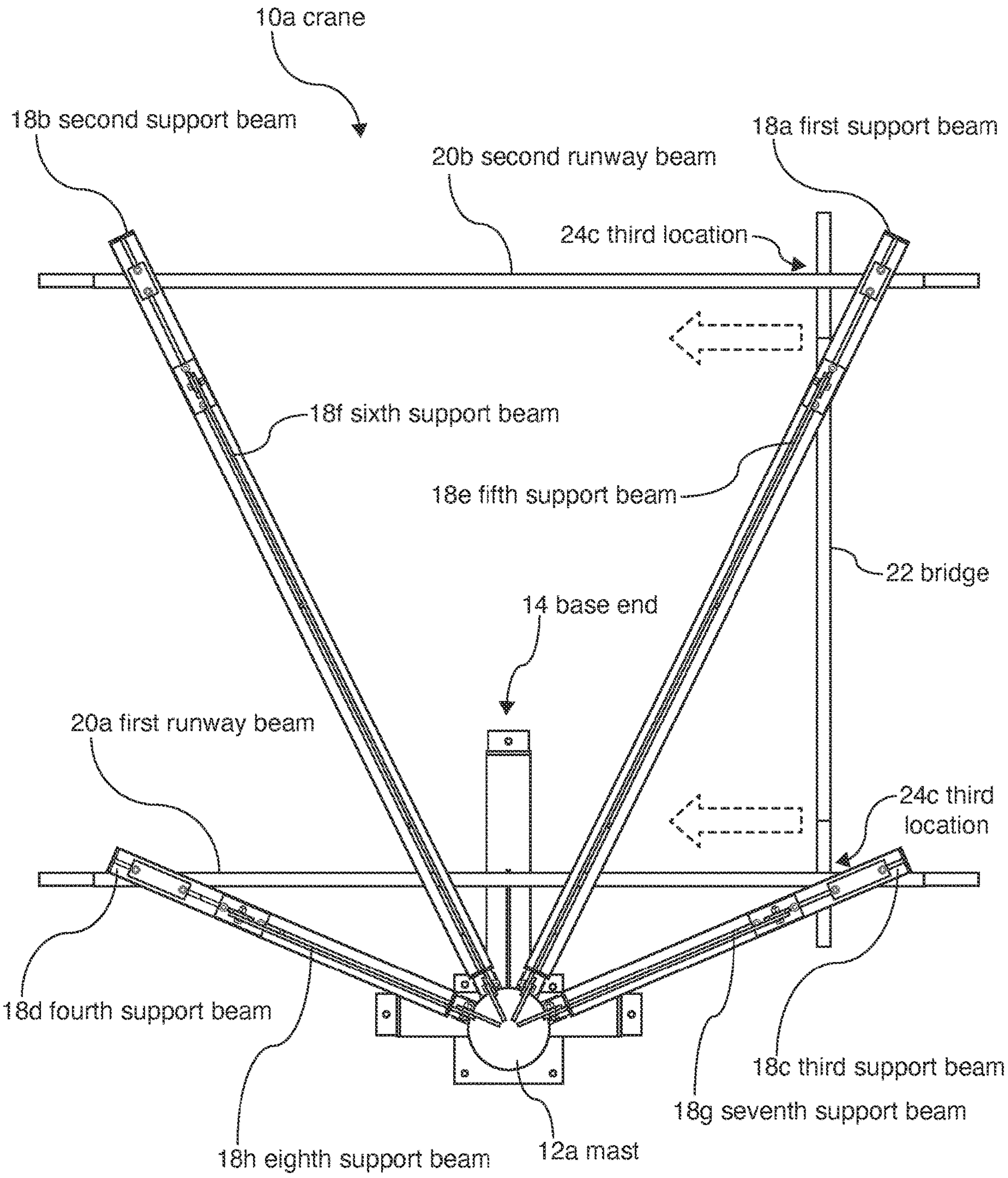
Figure 31:
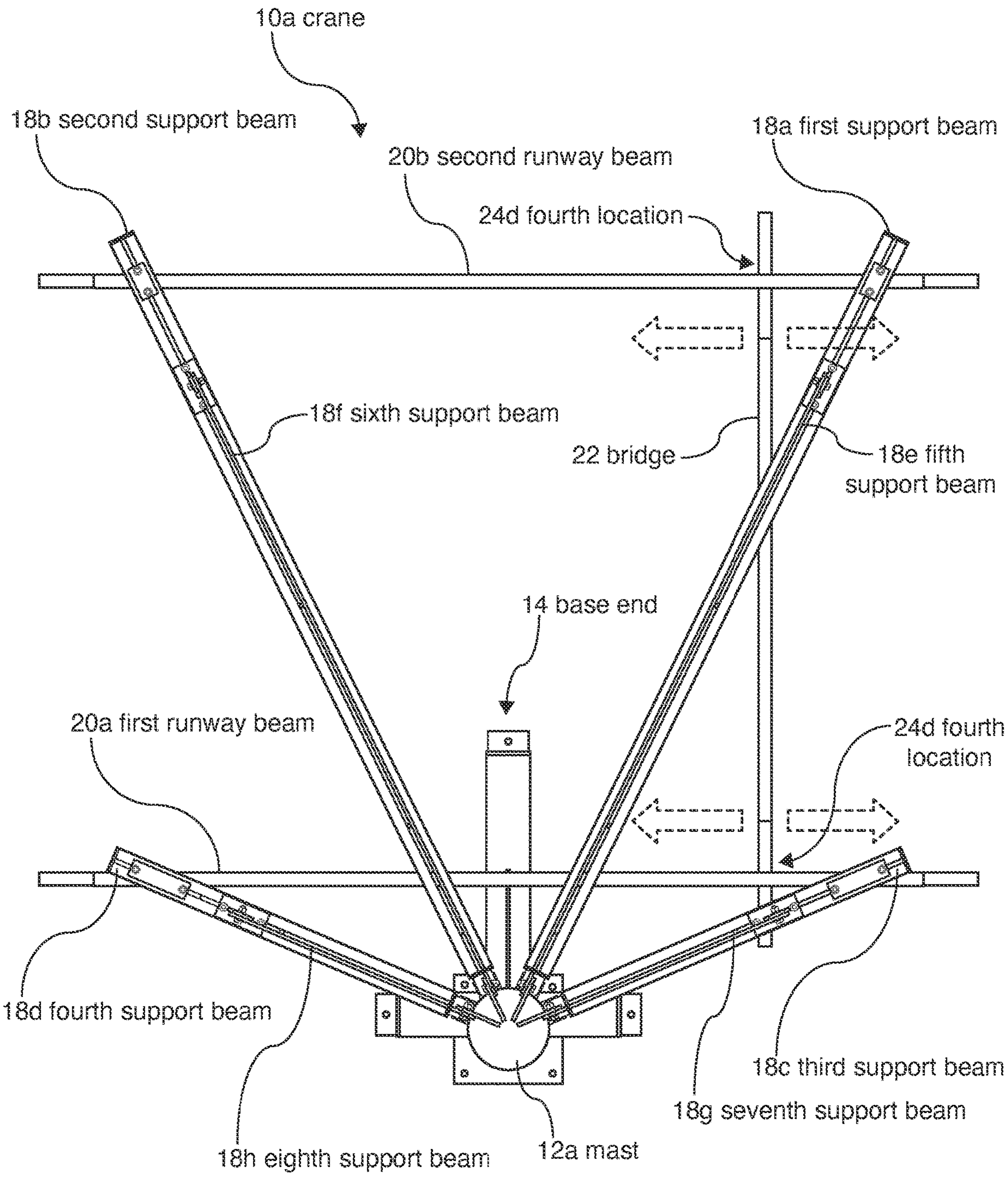

FIGS. 28-31 illustrate the movement of the bridge 22 along the first and second runway beams 20*a*, 20*b*. In many embodiments, the bridge 22 is slideably coupled to the first and second runway beams 20*a*, 20*b* such that the bridge 22 is configured to move between a first location 24*a* and a second location 24*b* of the first and second runway beams 20*a*, 20*b*, as shown in FIGS. 28 and 29, respectively. The bridge 22 may further move to a third location 24*c*, as shown in FIG. 30, and a fourth location 24*d*, as shown in FIG. 31. In addition, the bridge 22 may move to any location along the first and second runway beams 20*a*, 20*b*.

In some embodiments, the bridge 22 is configured to move along the first and second runway beams 20*a*, 20*b* via a series of wheels/rollers coupled to the bridge 22 and/or the runway beams 20*a*, 20*b*. The bridge 22 may be configured to move along the first and second runway beams 20*a*, 20*b* via a smooth material, such as grease or the like, configured to reduce friction, wherein the smooth material may be applied to at least one of the bridge 22, the first runway beam 20*a*, and the second runway beam 20*b*. Persons with ordinary skill in the art will appreciate that there may be other mechanisms that allow the bridge 22 to move along the runway beams 20*a*, 20*b*; such as magnets or any other suitable mechanism. In many embodiments, the bridge 22 is movably coupled to a bottom surface of the first and second runway beams 20*a*, 20*b*, such that the bridge 22 is coupled to the runway beams 20*a*, 20*b* on a surface opposite the surface of the runway beams 20*a*, 20*b* coupled to the at least one support beam 18.

Figure 32:
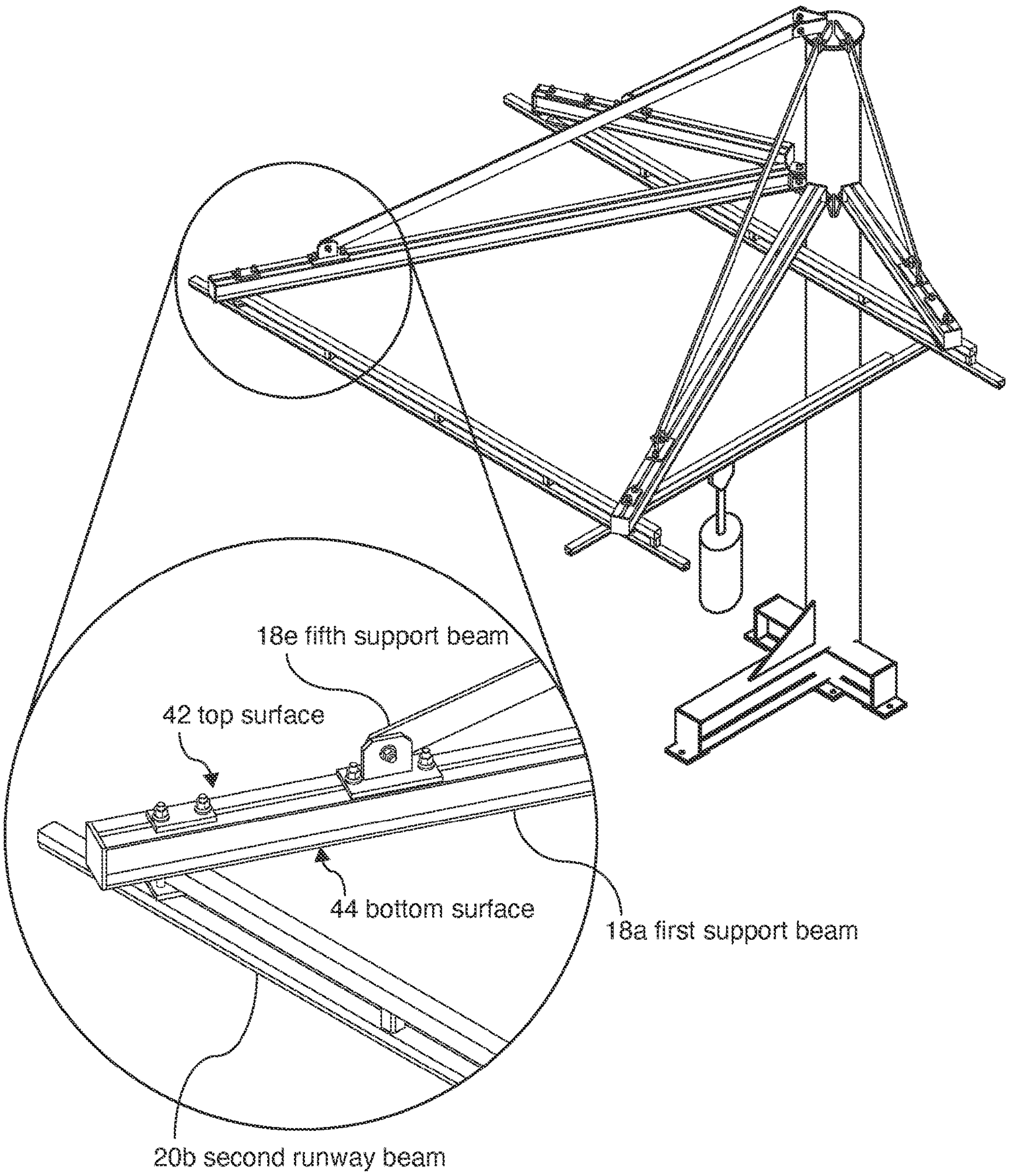
FIG. 32 illustrates a perspective view of a portion of a crane, according to some embodiments.

FIG. 32 illustrates an embodiment of the crane 10*a*, including a close-up view of a junction of the second runway beam 20*b*, the first support beam 18*a*, and the fifth support beam 18*e*. As shown in FIG. 32, in many embodiments, the fifth support beam 18*e* is fixedly coupled to a top surface 42 of the first support beam 18*a* and the second runway beam 20*b* is fixedly coupled to a bottom surface 44 of the first support beam 18*a*, wherein the bottom surface 44 is located opposite the top surface 42. Though FIG. 32 only includes the first and fifth support beams 18*a*, 18*e*, this same coupling design may also apply to the sixth, seventh, and eighth support beams 18*f*, 18*g*, and 18*h*. For example, the sixth support beam 18*f* may be fixedly coupled to a top surface of the second support beam 18*b* and the second runway beam 20*b* may be fixedly coupled to a bottom surface of the second support beam 18*b*, where the bottom surface may be located opposite the top surface. In some embodiments, the seventh support beam 18*g* is fixedly coupled to a top surface of the third support beam 18*c* and the first runway beam 20*a* is fixedly coupled to a bottom surface of the third support beam 18*c*, wherein the bottom surface is located opposite the top surface. The eighth support beam 18*h* may be fixedly coupled to a top surface of the fourth support beam 18*d* and the first runway beam 20*a* may be fixedly coupled to a bottom surface of the fourth support beam 18*d*, wherein the bottom surface may be located opposite the top surface.

Figure 34:
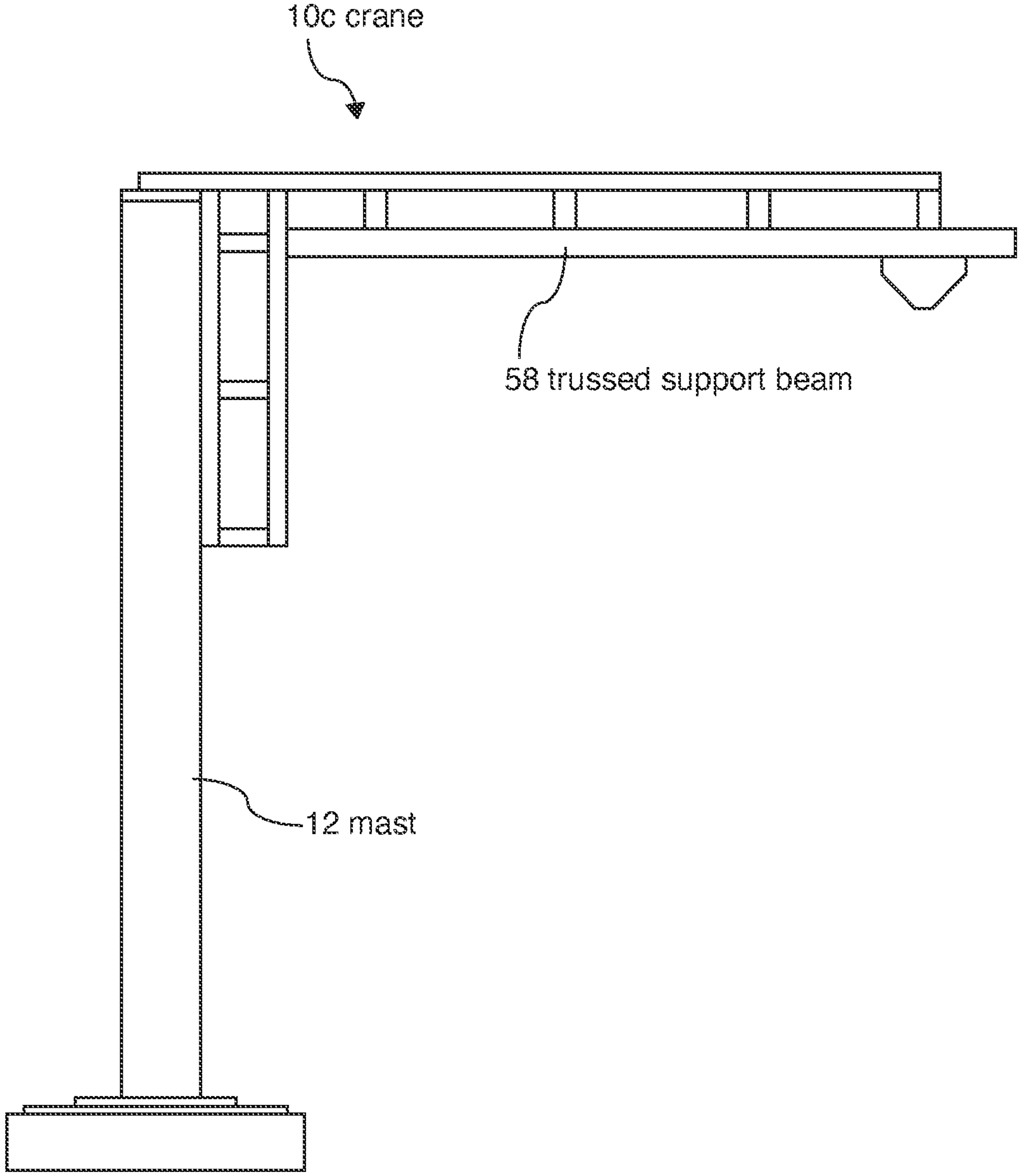
FIGS. 34 and 35 illustrate side views of a crane, according to some embodiments.
Figure 35:
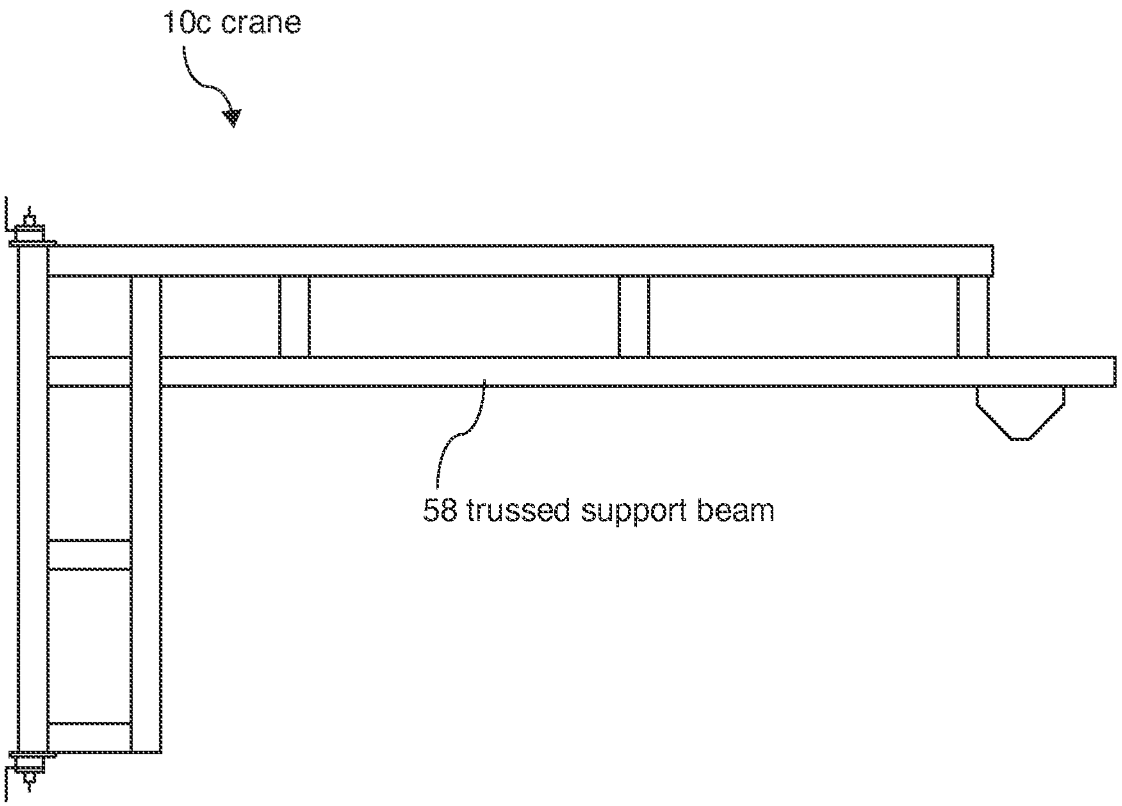

FIG. 33 illustrates an embodiment of a crane 10*b* including a mast 12 with a top end 16 and a base end 14, a first runway beam 20*a*, a second runway beam 20*b*, a bridge 22, a first support beam 18*a*, a second support beam 18*b*, a third support beam 18*c*, and a fourth support beam 18*d*. In many embodiments, the crane 10*b* differs from the crane 10*a* shown in the previous Figures in that the crane 10*b* does not include the upper support beams/struts. The crane 10*b* may not need the struts depending on at least one of the type of column used and the type of support beam used. For example, if the first, second, third, and fourth support beams 18*a*, 18*b*, 18*c*, 18*d* of the crane 10*b* comprise double c-channel supports, the crane 10*b* may not need the struts. Similarly, if the first, second, third, and fourth support beams 18*a*, 18*b*, 18*c*, 18*d* comprise I-beam supports, the crane 10*b* may not need the struts. The crane 10*b* may also not need the struts if the first, second, third, and fourth support beams 18*a*, 18*b*, 18*c*, 18*d* of the crane 10*b* comprise trussed support beams 58, as shown in FIGS. 34 and 35.

Instead of using the upper support beams, the double c-channel, and/or trussed support beams may be coupled to the mast 12 with extra support, such as additional fasteners, when compared to coupling the support beams to the mast 12 in the crane 10*a*. In addition, the mast 12 of the crane 10*b* may have a larger diameter and/or larger base end 14 than the mast 12 of the crane 10*a*. When compared to the mast 12 of the crane 10*a*, the mast 12 of the crane 10*b* may be shorter. Due to the lower height requirement for the mast 12 without the upper support beams, the crane 10*b* may enable placement of a crane in an area with height restrictions, where the crane 10*a* may be too tall. In some embodiments, when the first, second, third, and fourth support beams 18*a*, 18*b*, 18*c*, 18*d* comprise double c-channel beams, I-beams, and/or trussed support beams, the crane 10*b* does include struts. The use of struts may enable the use of smaller double c-channel beams, I-beams, and/or trussed support beams compared to the size of double c-channel beams, I-beams, and/or trussed support beams used without struts. In some embodiments, the crane 10*a* and/or the crane 10*b* comprises fewer than four support beams.

FIG. 33 also illustrates that, in some embodiments, the first, second, third, and fourth support beams 18*a*, 18*b*, 18*c*, 18*d* of the crane 10*b* are coupled to the top end 16 of the mast 12. In comparison, the first, second, third, and fourth support beams 18*a*, 18*b*, 18*c*, 18*d* of the crane 10*a* are coupled near the top end 16, but lower on the mast 12, as illustrated in the previous Figures. In many embodiments, the crane 10*b* comprises a shorter mast 12 than the crane 10*a*, but the first and second runway beams 20*a*, 20*b*, bridge 22, and first, second, third, and fourth support beams 18*a*,

18*b*, 18*c*, 18*d* are located at equal heights above the ground on both cranes 10*a* and 10*b*. The crane 10*a* and the crane 10*b* may have the same capacity, despite the difference in heights of the mast 12.

FIGS. 34 and 35 illustrate embodiments of the crane 10*c* comprising a trussed support beam 58. FIG. 34 shows the trussed support beam 58 coupled to a mast 12, while FIG. 35 illustrates that the trussed support beam 58 may be configured to couple to a building column or building wall, rather than a mast 12. It should be noted that the trussed support beam 58 may comprise an I-beam with trusses, a double c-channel beam with trusses, and/or a rectangular tube beam with trusses As illustrated, a trussed support beam 58 may not need the additional support provided by struts. In some embodiments, the trolley couples directly to the trussed support beam 58 rather than to a bridge 22, as shown in the previous Figures. Trussed support beams may be used on traditional jib cranes and traditional workstation cranes, in addition to the crane 10*c* of this disclosure. In some embodiments, the crane 10*c* includes four trussed support beams 58, similar to the four support beams of the crane 10*b* shown in FIG. 33. The crane 10*c* may include fewer than four trussed support beams 58. In some embodiments, the crane 10*c* includes more than four trussed support beams 58.

Figure 36:
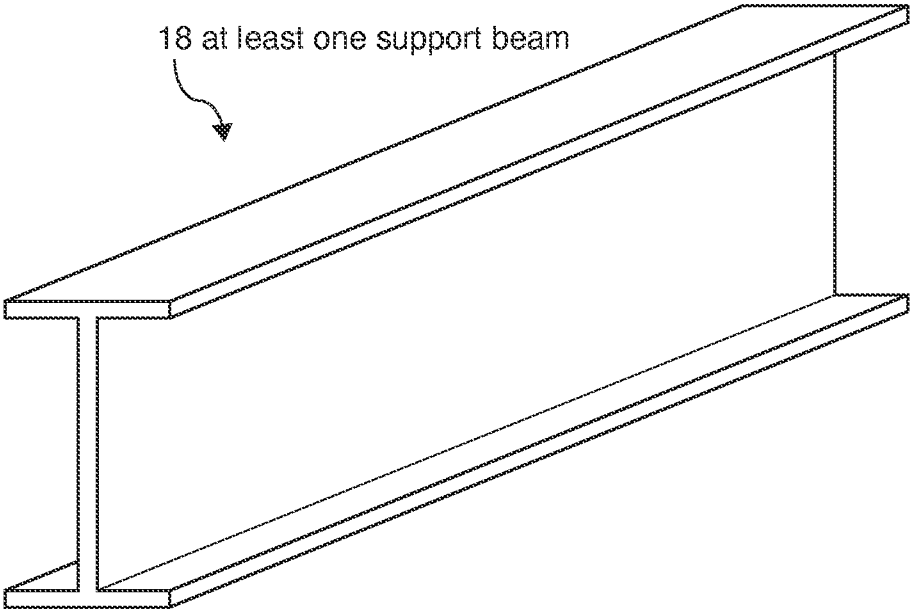
FIGS. 36 and 37 illustrate cross-sectional views of at least one support beam of a crane, according to some embodiments.
Figure 37:
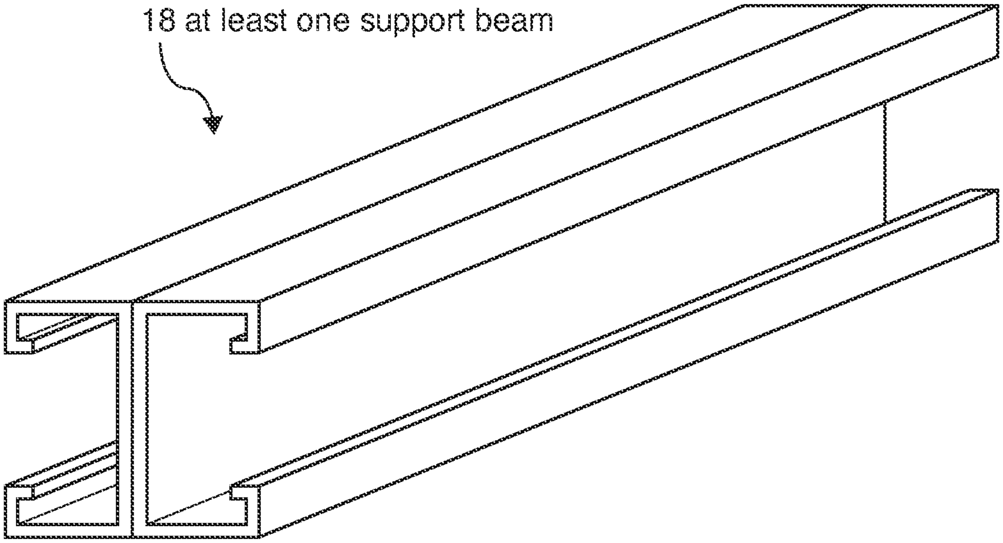

FIGS. 36 and 37 illustrate cross-sectional views of the at least one support beam 18. In some embodiments, the at least one support beam 18 comprises an I-beam, as demonstrated in FIG. 36. The at least one support beam 18 may comprise a double c-channel beam, as shown in FIG. 37, Though not illustrated, the at least one support beam 18 may also comprise a rectangular tube beam. In some embodiments, the at least one support beam 18 comprises a square tube beam. The use of a rectangular and/or square tube beam is similar to the use of an I-beam and/or a double c-channel beam, in that any of the listed beam types may be used with or without struts, as shown in the cranes 10*a* and 10*b*, respectively. Using a square and/or rectangular tube beam with struts may allow for the use of a smaller square and/or rectangular tube beam, as compared to using the beam without struts. FIGS. 36 and 37 may also represent cross-sectional views of the fifth, sixth, seventh, and eighth support beams 18*e*, 18*f*, 18*g*, 18*h*.

As previously discussed in this disclosure, the crane 10 has some advantages when compared to a traditional jib style crane, including greater flexibility in the type of base and the type of column that may be used. The following table outlines some general features and compares the crane 10 to a traditional jib crane and a traditional workstation crane. The features included in the table are intended as a nonlimiting list of features.

As indicated by the table, the crane 10 includes a bridge, the ability to rotate, the ability to be moved, a high capacity, low installation time and space requirements, and high span and reach capabilities. In comparison, the traditional jib crane does not include a bridge, but does have the ability to rotate, the ability to be moved, a low space requirement, and limited span and reach for lifting and locating objects. A traditional workstation crane includes a bridge and a high capacity, but does not include the ability to rotate, the ability to be moved, and requires a lot of space. One element where the crane 10 is distinguished from both the traditional jib and workstation cranes is installation time, where the crane 10 has a low installation time and the traditional jib and workstation cranes have a high installation time. Additionally, the crane 10 disclosed throughout, may have higher capacity than the traditional jib crane, lower space requirements as compared to the traditional workstation crane, and higher span and reach, with regards to its ability to retrieve and move.

| | Present Invention | Traditional Jib Crane | Traditional Workstation Crane |
|---|---|---|---|
| Bridge | X | — | X |
| Rotation | X | X | — |
| Portability | X | X | — |
| Capacity | High | Low | High |
| Installation Time | Low | High | High |
| Space Required | Low | Low | High |
| Span and reach | High | Low | High |

In many embodiments, the installation time requirement of each type of crane is related to the degree of plumbness needed as well as the amount of hardware required to install each crane. For example, a traditional workstation crane includes a lot of hardware, as a traditional workstation crane includes either four columns or four points of contact with a ceiling, in the case of a suspended workstation crane. In contrast, both a traditional jib crane and the crane 10 include only one column. Accordingly, the installation time of the crane 10 may be approximately of the installation time of a traditional workstation crane. It should be noted that ¼ is only an approximate example, and the installation time of the crane 10 may be closer to ⅓ of the installation time of a traditional workstation crane. The installation time of the crane 10 may be as much as about ½ of the installation time of a traditional workstation crane.

In many embodiments, the degree of plumbness is the key differentiating factor when comparing installation of the crane 10 to installation of a traditional jib crane. It should be noted that "plumb" may be considered a counterpart to "level," and is a measure of verticality. For example, a runway beam may be level, or perfectly horizontal, while a mast may be plumb, or perfectly vertical. A traditional jib crane requires a high degree of plumbness, as it is important to minimize movement of the mast when the jib arm pivots around the mast. Ensuring that the mast is plumb takes a lot of time, and, in some embodiments, is the most time-intensive portion of installing a traditional jib crane. In bridge-type systems, like the crane 10, plumbness is less important. As previously discussed, the crane 10 may be a fixed crane or a rotating crane. During installation of a fixed crane 10, the mast 12 need only be reasonably plumb and it is more important that the runway beams 20*a*, 20*b* are level than that the mast 12 is plumb. In some embodiments, levelness of the runway beams 20*a*, 20*b* is set independent of the piumbness of the mast 12. As such, installation is faster because it often takes less time to make the runway beams 20*a*, 20*b* level than it would to make the mast 12 plumb. During installation of a rotating crane 10, plumbness is a larger factor than during installation of a fixed crane 10. However, even with a rotating crane 10, the levelness of the runway beams 20*a*, 20*b* is more important than the piumbness of the mast 12, and the plumbness of the mast 12 of the rotating crane 10 is less critical than the plumbness of the mast of a traditional jib crane.

The crane 10 of the present disclosure may be considered the "best of both worlds" of a traditional jib crane and a traditional workstation crane. The crane 10 offers the flexibility of a workstation crane while only taking up the floor space of a jib crane. The crane 10 provides the high capacity of a jib crane with the infrastructure and stability of a workstation crane, including the bridge. The crane 10 may be installed in about ¼-⅓ of the time of a traditional jib crane or a traditional workstation crane. The crane 10 may be useful for an environment (factory, warehouse, etc.) that doesn't need or want the rotation of a jib crane, but also doesn't want to take up the space of a workstation crane. The crane 10 can be configured to move around a factory/warehouse floor, as discussed with reference to the counterweight base including forklift pockets and/or wheels. The crane 10 can be fixedly coupled to a floor. In some embodiments, the height of the mast, the span of the bridge, and the capacity of the crane 10 determine if the crane 10 can be fixedly coupled directly to a floor surface or if a concrete footing should be poured prior to coupling the crane 10 to the floor.

In some embodiments, a method of using the crane 10 to lift and lower an object 32 comprise detachably coupling the object 32 to a hoist 30, wherein the hoist 30 is at least one of mechanically and electrically coupled to a trolley 26, electrically coupling the hoist 30 to a power source, and engaging the hoist 30, via the power source, to lift and lower the object 32. The power source may be configured to provide power to at least one motor of the crane 10. For example, the crane 10 may comprise a first motor configured to rotate the at least one support beam 18 and the struts around the mast 12. The crane 10 may comprise a second motor configured to move the bridge 22 along the first and second runway beams 20*a*, 20*b*. The crane 10 may comprise a third motor configured to move the trolley 26 along the bridge 22. In some embodiments, the crane 10 comprises a fourth motor configured to engage the hoist 30 in order to at least one of lift and lower the hoist 30. The trolley 26 may include a winding mechanism, and the fourth motor may be operatively coupled to the winding mechanism such that the fourth motor controls winding and/or unwinding the hoist 30. In some embodiments, the crane 10 comprises more than four motors. The crane 10 may comprise fewer than four motors. In some embodiments, the crane 10 is substantially entirely operated by hand, without the aid of power-operated mechanical components.

Figure 38:
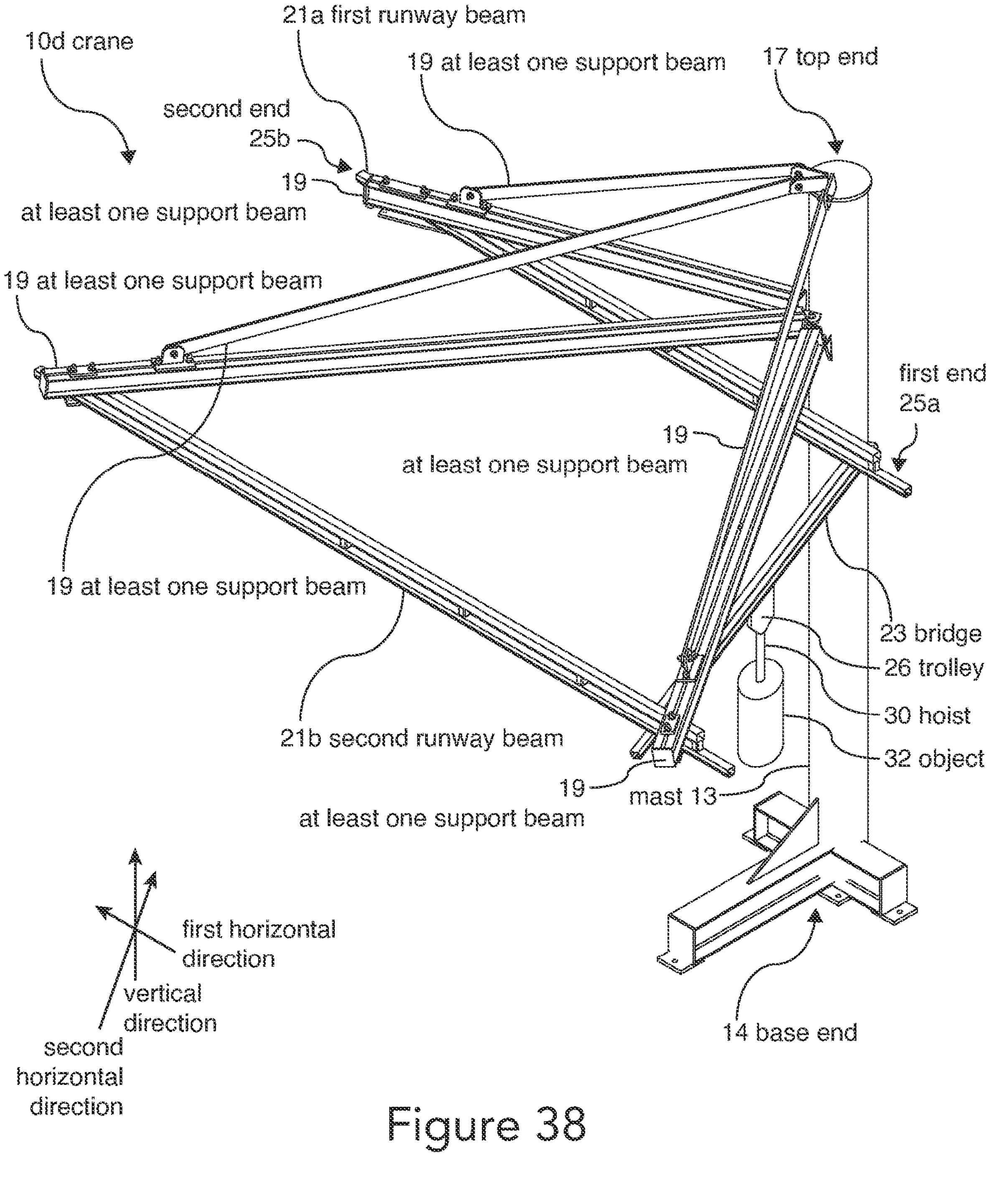
FIG. 38 illustrates a perspective view of a crane where a mast is located adjacent a first end of a first runway beam, according to some embodiments.

FIG. 38 illustrates a perspective view of a crane 10*d*. Similar to the crane 10*a* discussed previously in this disclosure, the crane 10*d* may comprise a mast 13, a first runway beam 21*a*, a second runway beam 21*b*, at least one support beam 19, and a bridge 23. In some embodiments, the mast 13, like the mast 12 of the crane 10*a*, extends along a vertical direction and comprises a base end 14 and a top end 17 located opposite the base end 14. Similar to the at least one support beam 18, the at least one support beam 19 may be fixedly coupled to the mast 13 adjacent the top end 17. In some embodiments, as illustrated in the Figures, the at least one support beam 19 comprises fewer support beams than the at least one support beam 18. The total number of beams in the at least one support beam 19 will be discussed further later in the disclosure.

Figure 39:
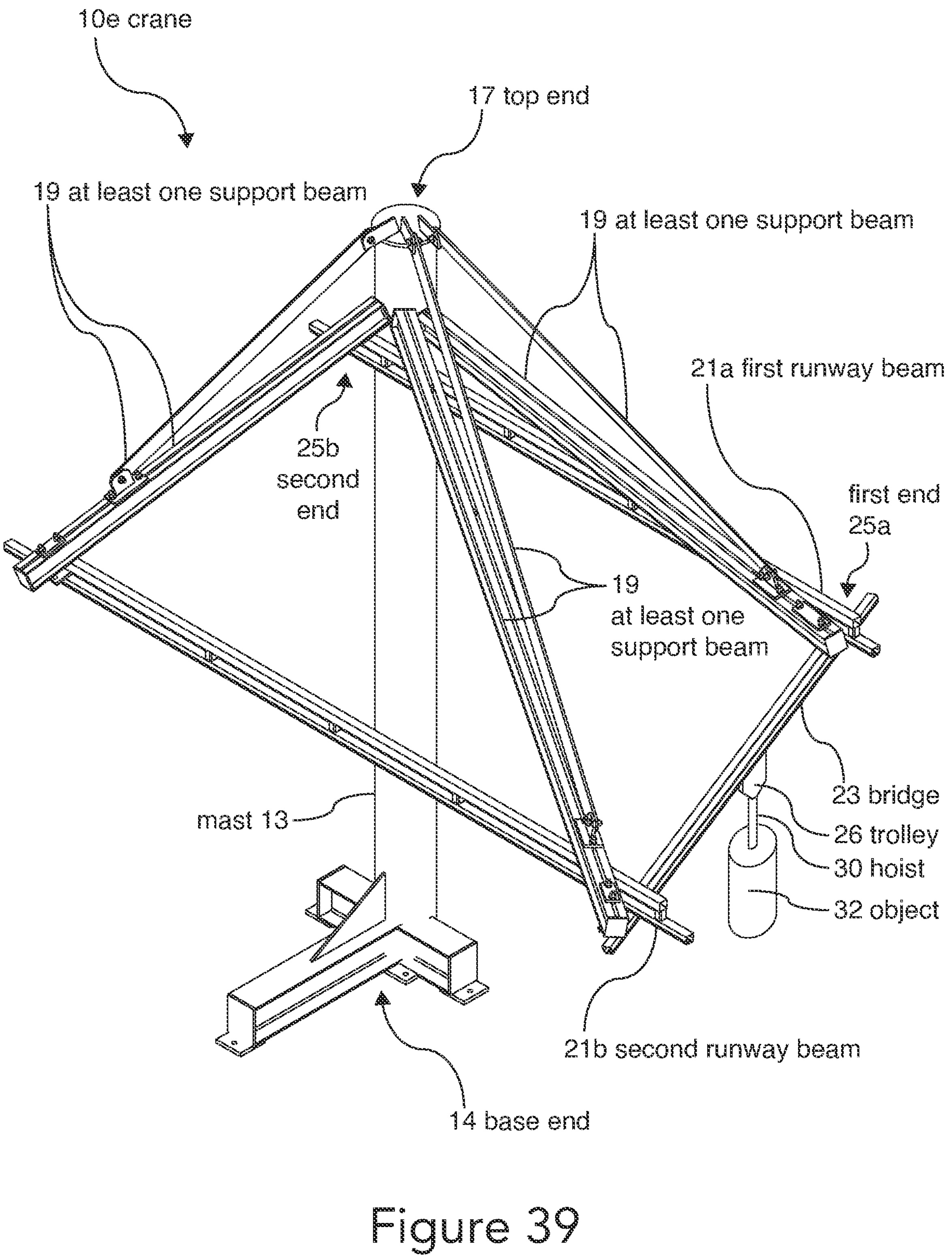
FIG. 39 illustrates a perspective view of a crane where a mast is located adjacent a second end of a first runway beam, according to some embodiments.

In some embodiments, the first runway beam 21*a* is configured to extend along a horizontal direction perpendicular to the vertical direction. The first runway beam 21*a* may define a first end 25*a* and a second end 25*b* located opposite the first end 25*a*, as shown in FIG. 38. In some embodiments, the mast 13 is located closer to the first end 25*a* than the second end 25*b*. The mast 13 may be located adjacent the first end 25*a*, as shown in FIG. 38. The mast 13 may be located closer to the second end 25*b* than the first end 25*a*. In some embodiments, the mast 13 is located adjacent the second end 25*b*, as illustrated in FIG. 39 showing a crane 10*e*. Though not shown in the Figures, the mast 13 may be located adjacent a first end or a second end of the second runway beam 21*b*, rather than the first runway beam 21*a*. In some embodiments, the first runway beam 21*a* is fixedly coupled to the at least one support beam 19. The second runway beam 21*b* may also be configured to extend along the horizontal direction and may be spaced from the first runway beam 21*a*, as indicated in FIGS. 38 and 39. In some embodiments, the second runway beam 21*b* is also fixedly coupled to the at least one support beam 19.

As shown in FIGS. 38 and 39, the cranes 10*d* and 10*e*, respectively, may comprise a bridge 23. in some embodiments, the bridge 23 is movably coupled to the first runway beam 21*a* and the second runway beam 21*b*, and is arranged and configured to move between a first location and a second location of the first runway beam 21*a* and the second runway beam 21*b*. The bridge 23 may be considered substantially the same as the bridge 22 shown in, and discussed with reference to, FIGS. 1-12, 19-23, 28-31, and 33. In some embodiments, the crane 10*d*, 10*e* further comprises a trolley 26 movably coupled to the bridge 23, wherein the trolley 26 is arranged and configured to move between a first location and a second location of the bridge 23. The crane 10*d*, 10*e* may further comprise a hoist 30 coupled to the trolley 26, wherein the hoist 30 may be configured to lift and lower an object 32 with respect to the trolley 26. It should be noted that the trolley 26, hoist 30, and object 32 may be substantially the same as the trolley 26, hoist 30, and object 32 shown in FIGS. 1-12 and 19.

FIG. 38 includes a directional indicator showing the vertical direction, first horizontal direction, and second horizontal direction. As previously mentioned, in some embodiments, the mast 13 is configured to extend along the vertical direction and each of the first runway beam 21*a* and the second runway beam 21*b* are configured to extend along a horizontal direction. In some embodiments, the horizontal direction defines a first horizontal direction, and the bridge 23 extends along a second horizontal direction perpendicular to the first horizontal direction and the vertical direction.

Figure 40:
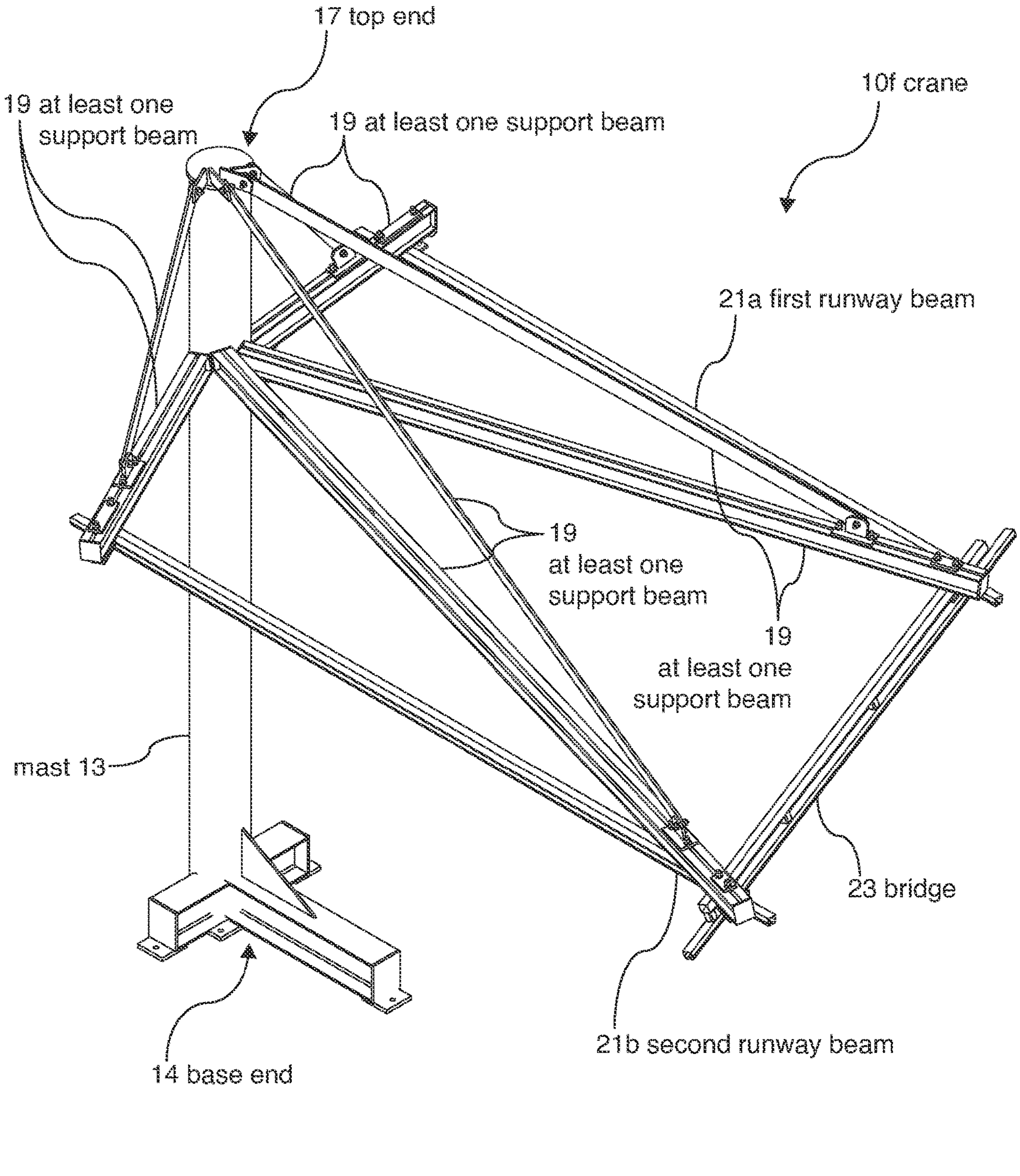
FIG. 40 illustrates a perspective view of a crane where a mast is located between a first runway beam and a second runway beam, according to some embodiments.

FIG. 40 illustrates a perspective view of a crane 10*f*. Similar to the cranes 10*d* and 10*e* shown in FIGS. 38 and 39, the crane 10*f* may comprise a mast 13, a first runway beam 21*a*, a second runway beam 21*b*, at least one support beam 19, and a bridge 23. However, unlike the cranes 10*d*, 10*e* where the mast 13 is located adjacent only the first runway beam 21*a*, the crane 10*f* comprises a mast 13 located between the first runway beam 21*a* and the second runway beam 21*b*. The mast 13 may be substantially equidistant from both the first runway beam 21*a* and the second runway beam 21*b*. In some embodiments, the mast 13 is located closer to the first runway beam 21*a* than the second runway beam 21*b*. The mast 13 may be located closer to the second runway beam 21*b* than the first runway beam 21*a*. In the embodiment shown in FIG. 40, the bridge 23 may be configured to move along the first runway beam 21*a* and the second runway beam 21*b* toward and/or away from the mast 13. It should be noted that FIGS. 38, 39, and 40 are intended to illustrate a few non-limiting examples of locations of the mast 13 around the crane 10*d*, 10*e*, 10*f*. The mast 13 may be located anywhere around the perimeter of the first runway beam 21*a* and the second runway beam 21*b*. In addition, it should be noted that though the trolley 26, hoist 30, and object 32 are not shown in FIG. 40, the bridge 23 of the crane 10*f* may be configured to couple to the trolley 26, hoist 30, and object 32 as shown in FIGS. 38 and 39.

Figure 41:
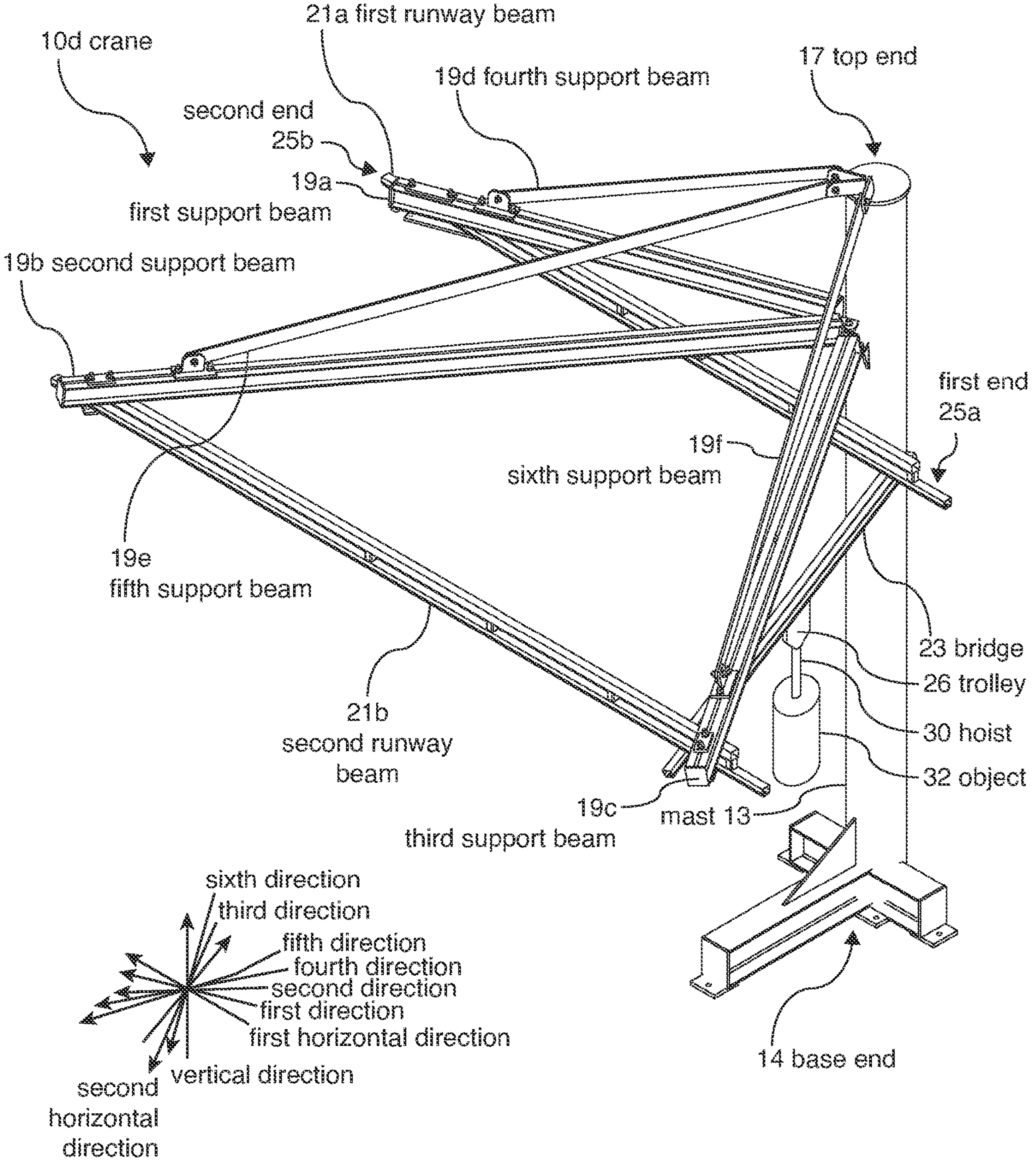
FIGS. 41 and 42 illustrate perspective views of a crane, according to some embodiments.

FIG. 41 is similar to FIG. 38, but includes labels for each individual support beam 19. In some embodiments, the at least one support beam 19 comprises a first support beam 19*a* extending along a first direction, a second support beam

19*b* extending along a second direction, and a third support beam 19*c* extending along a third direction, as illustrated by the directional indicator in FIG. 41. The crane 10*d* may further comprise a fourth support beam 19*d* extending along a fourth direction, a fifth support beam 19*e* extending along a fifth direction, and a sixth support beam 19*f* extending along a sixth direction. Though discussed in terms of the crane 10*d*, the crane 10*e* of FIG. 39 may also comprise six total support beams 19*a*-19*f*. The support beams 19*a*, 19*b*, 19*c* may be referred to as "lower" support beams, while the support beams 19*d*, 19*e*, 19*f* may be referred to as "upper" support beams.

It should be noted that the first; second, and third support beams 19*a*, 19*b*, 19*c* may be substantially similar to the first, second, and third support beams 18*a*, 18*b*, 18*c* shown in FIG. 3. Similarly, the fourth, fifth, and sixth support beams 19*d*, 19*e*, 19*f* may be substantially similar to the fifth, sixth, and seventh support beams 18*e*, 18*f*, 18*g* shown in FIG. 5. In some embodiments, due to the location of the mast 13 adjacent the first end 25*a* of the first runway beam 21*b*, the crane 10*d* comprises three "lower" and three "upper" support beams 19, rather than the four "lower" and four "upper" support beams 18 shown in FIGS. 3 and 5 (among others), where the mast 12 is located adjacent a center portion of the first runway beam 20*a*. The additional fourth "lower" and eighth "upper" support beam may not be required when the mast 13 is located adjacent an end of the first runway beam 21*a*, as with the crane 10*d* or the crane 10*e*. It should be noted that the crane 10*f*, shown in FIG. 40, does include four "upper" and four "lower" support beams, similar to the earlier Figures of this disclosure.

In some embodiments, as shown in FIG. 41, the first support beam 19*a* comprises a first end fixedly coupled to the mast 13 and a second end fixedly coupled to the first runway beam 21*a*. The second and third support beams 19*b*, 19*c* may each comprise a first end fixedly coupled to the mast 13 and a second end fixedly coupled to the second runway beam 21*b*. The fourth support beam 19*d* may be configured to extend from the top end 17 of the mast 13 to the first support beam 19*a*, and may be fixedly coupled to the first support beam 19*a* at a location between the first end and the second end of the first support beam 19*a*, as shown in FIG. 41. Similarly, the fifth support beam 19*e* may be configured to extend from the top end 17 of the mast 13 to the second support beam 19*b*, and may be fixedly coupled to the second support beam 19*b* at a location between the first end and the second end of the second support beam 19*b*. In some embodiments, the sixth support beam 19*f* is configured to extend from the top end 17 of the mast 13 to the third support beam 19*c*, and may be fixedly coupled to the third support beam 19*c* at a location between the first end and the second end of the third support beam 19*c*.

Similar to what is illustrated in FIG. 32 with the first support beam 18*a* and the fifth support beam 18*e*, the fourth support beam 19*d* may be fixedly coupled to a top surface of the first support beam 19*a* and the first runway beam 21*a* may be fixedly coupled to a bottom surface of the first support beam 19*a*, where the bottom surface is located opposite the top surface. In some embodiments, the fifth support beam 19*e* is fixedly coupled to a top surface of the second support beam 19*b* and the second runway beam 21*b* is fixedly coupled to a bottom surface of the second support beam 19*b*, where the bottom surface is located opposite the top surface. The sixth support beam 19*f* may be fixedly coupled to a top surface of the third support beam 19*c* and the second runway beam 21*b* may be fixedly coupled to a bottom surface of the third support beam 19*c*, wherein the bottom surface may be located opposite the top surface.

Figure 42:
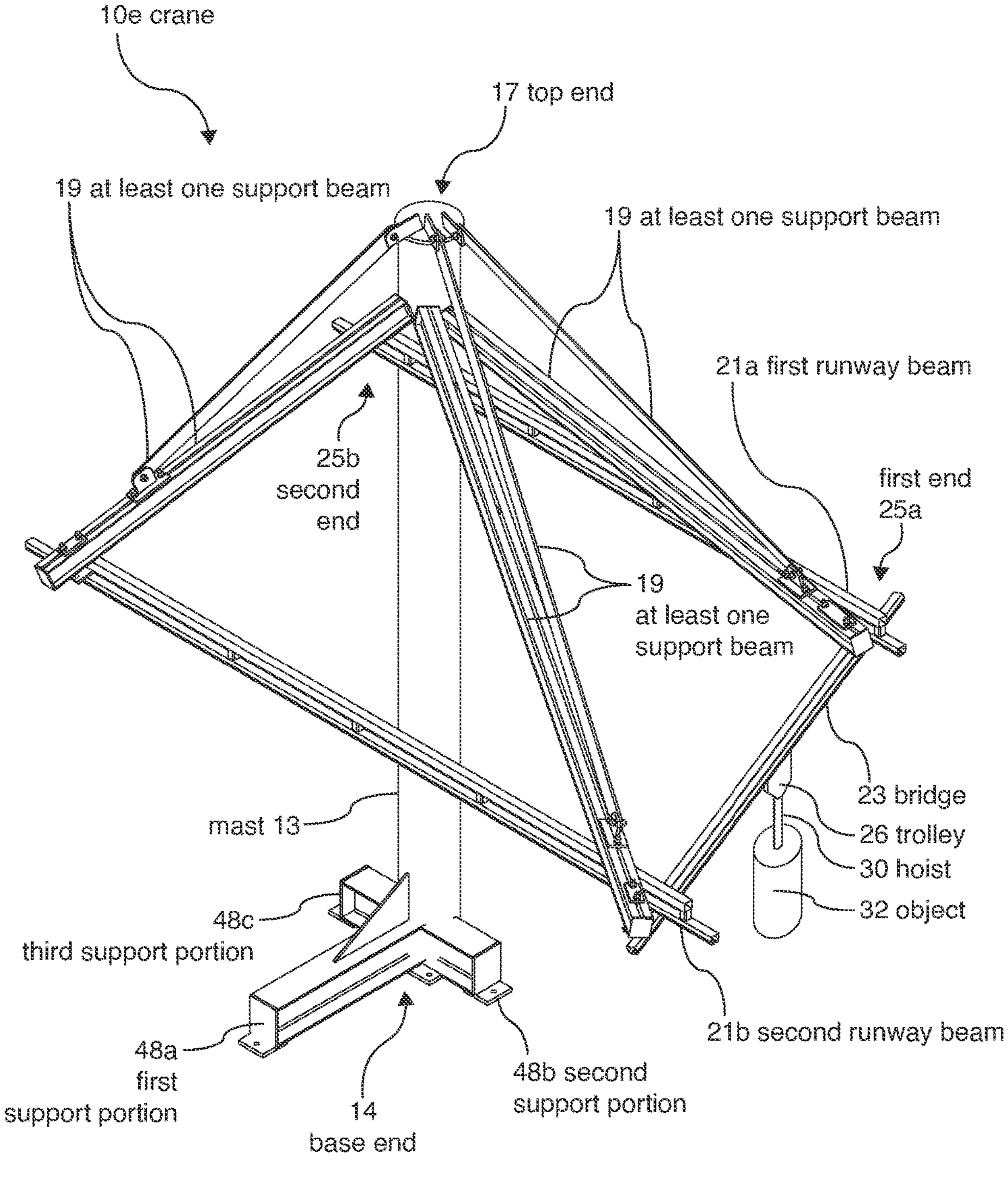

FIG. 42 shows a perspective view of the crane 10*e* first illustrated in FIG. 39, and includes additional details of the base end 14 of the mast 13. In some embodiments, the base end 14 comprises a first support portion 48*a*, a second support portion 48*b*, and a third support portion 48*c*. As illustrated in FIG. 42, the first support portion 48*a* may extend perpendicular to the second support portion 48*b* and the third support portion 48*c*. In some embodiments, the second support portion 48*b* extends opposite the third support portion 48*c*. It should be noted that the base end 14 shown in FIGS. 38-42 may be substantially similar to the base end 14 previously discussed in this disclosure, in particular with reference to FIGS. 2-5 and 13.

In some embodiments, rather than the support portions 48*a*, 48*b*, 48*c*, the base end 14 of the mast 13 is fixedly coupled to a counterweight restably coupled to a ground surface, as shown in FIGS. 8-10 and 14-16. The counterweight may comprise at least one of a plurality of wheels configured to roll and a plurality of forklift pockets. Each forklift pocket of the plurality of forklift pockets may be configured to receive a fork of a forklift. In some embodiments, the plurality of wheels and/or the forklift pockets enable the crane 10 to be moved around a ground surface, such as around a factory floor. The base end 14 of the mast 13 may also be fixedly coupled to a different type of base, such as either of the hex bases 52*a*, 52*b* shown in FIGS. 11, 12, 17, and 18. In some embodiments, the base end 14 of the mast 13 comprises at least one support portion defining a length directly related to the capacity of the crane 10. For example, if the crane 10 is configured for a high capacity, the at least one support portion may define a greater length than if the crane 10 is configured for a lower capacity, in order to prevent tipping of the crane 10.

Figure 43:
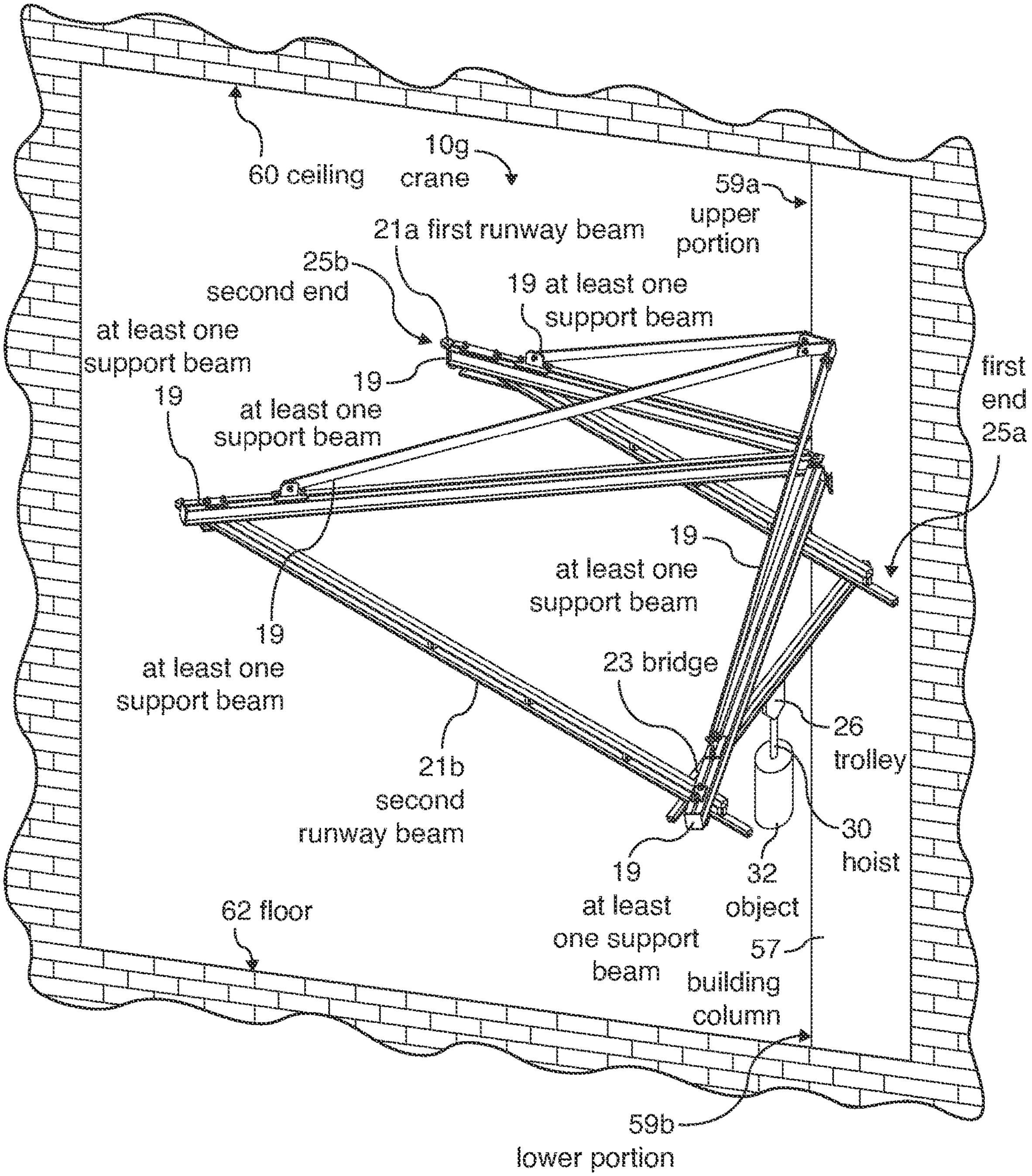
FIG. 43 illustrates a perspective view of a crane coupled to a building column, according to some embodiments.

FIG. 43 illustrates one embodiment of a crane 10*g*. The crane 10*g* may be similar to the crane 10*d*, 10*e*, however, rather than comprising a mast 13 coupled to the at least one support beam 19, the crane 10*g* may comprise a building column 57 coupled to the at least one support beam 19. In some embodiments, as shown in FIG. 43, the crane 10*g* comprises a first runway beam 21*a* defining a first end 25*a* and a second end 25*b*, a second runway beam 21*b*, at least one support beam 19, and a bridge 23. The building column 57 may be located closer to the first end 25*a* than the second end 25*b* of the first runway beam 21*a*. In some embodiments, the building column 57 is located adjacent the first end 25*a*, as illustrated in FIG. 43. The building column 57 may be located closer to the second end 25*b* than the first end 25*a* of the first runway beam 21*a*. In some embodiments, the building column 57 is located adjacent the second end 25*b*. It should also be noted that like the mast 13, the building column 57 may be located anywhere around the perimeter of the crane 10*g*, including adjacent any portion of the first runway beam 21*a*, adjacent any portion of the second runway beam 21*b*, or between the first and second runway beams 21*a*, 21*b*.

In some embodiments, the building column 57 extends along a vertical direction like the mast 13, and comprises and upper portion 59*a* and a lower portion 59*b*. The upper portion 59*a* may be located adjacent a ceiling 60 of a building, while the lower portion 59*b* may be located adjacent a floor 62 of the building. As illustrated in FIG. 43, the at least one support beam 19 may be configured to couple to the building column 57 closer to the upper portion 59*a* than the lower portion 59*b*. The terms "upper portion 59*a*" and "lower portion 59*b*" are intended to refer to large portions of the building column 57. For example, the upper portion 59*a* may define the upper half of the building column 57, while the lower portion 59*b* defines the lower half. In some embodiments, the upper portion 59*a* defines an upper third of the building column 57, while the lower portion 59*b* defines a lower third of the building column 57. The upper portion 59*a* may define an upper quarter of the building column 57, and the lower portion 59*b* may define a lower quarter of the building column 57.

The at least one support beam 19 may be configured to couple to the building column 57 via any suitable methods for fixed mechanical coupling, including, but not limited to, bolts, screws, brackets, industrial adhesive, and the like. In some embodiments, the crane 10*g* comprising the building column 57 includes both the "upper" and "lower" support beams 19, as shown in FIG. 43. An embodiment of the crane 10*g* comprising the building column 57 may comprise only the "lower" support beams 19. The at least one support beam 19 of the crane 10*g* may be substantially the same as the at least one support beam 19 of the cranes 10*d*, 10*e*. In some embodiments, the building column 57 is located adjacent a center portion of one of the first runway beam 21*a* and the second runway beam 21*b*, and the at least one support beam 19 comprises four "upper" and four "lower" support beams 19, as shown in FIG. 40 with the crane 10*f*. The bridge 23, trolley 26, hoist 30, and object 32 may be substantially the same as the bridge 23, trolley 26, hoist 30, and object 32 shown in FIGS. 38, 39, 41, and 42.

It should be noted that the at least one support beam 19, the first runway beam 21*a*, the second runway beam 21*b*, the bridge 23, the mast 13, and the building column 57 may define any type of beam previously discussed in this disclosure, including, but not limited to, I-beams, double C-channels, trussed beams, square beams, round beams, and/or any other suitable type of beam. In some embodiments, any of the cranes 10*a*, 10*b*, 10*c*, 10*d*, 10*e*, and/or 10*f* comprise a single mast 12, 13 or a single building column 56, 57, as applicable, rather than multiple masts and/or multiple building columns as seen on some traditional cranes, particularly workstation cranes.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The term "substantially" is used to mean "completely" or "nearly completely." For example, the disclosure includes, "the first runway beam 22*a* and second runway beam 22*b* may be substantially parallel to one another." In this context, "substantially parallel" means that the first runway beam and second runway beam are completely or nearly completely parallel.

The term "adjacent" is used to mean "next to or adjoining." For example, the disclosure includes, "at least one support beam fixedly coupled to the mast adjacent the top end of the mast." In this context, "adjacent the top end of the mast" means that the at least one support beam is fixedly coupled next to, but not necessarily on, the top end of the mast, as shown in FIG. 1.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

I claim:

1. A crane, comprising:

a mast extending along a vertical direction, the mast comprising a base end and a top end located opposite the base end;

at least one support beam, the at least one support beam fixedly coupled to the mast adjacent the top end of the mast;

a first runway beam extending along a horizontal direction perpendicular to the vertical direction and fixedly coupled to the at least one support beam;

a second runway beam extending along the horizontal direction and fixedly coupled to the at least one support beam, the second runway beam spaced from the first runway beam, wherein the mast is located between the first runway beam and the second runway beam;

a bridge movably coupled to the first runway beam and the second runway beam, the bridge arranged and configured to move between a first location and a second location of the first runway beam and the second runway beam;

a trolley movably coupled to the bridge, wherein the trolley is arranged and configured to move between a first location and a second location of the bridge; and a hoist coupled to the trolley, the hoist configured to lift and lower an object with respect to the trolley.

2. The crane of claim 1, wherein the first runway beam defines a first end located a first distance from the mast and a second end located a second distance from the mast, wherein the second distance is greater than the first distance, and wherein the second runway beam defines a first end located a first distance from the mast and a second end located a second distance from the mast, wherein the second distance is greater than the first distance.

3. The crane of claim 2, wherein the at least one support beam comprises a first support beam extending along a first direction and a second support beam extending along a second direction, the first support beam and the second support beam each comprising a first end fixedly coupled to the mast and a second end fixedly coupled to the second runway beam.

4. The crane of claim 3, wherein the second end of the first support beam is fixedly coupled adjacent the first end of the second runway beam, and wherein the second end of the second support beam is fixedly coupled adjacent the second end of the second runway beam, such that the second support beam is longer than the first support beam.

5. The crane of claim 3, wherein the at least one support beam comprises a third support beam extending along a third direction and a fourth support beam extending along a fourth direction, the third support beam and the fourth support beam each comprising a first end fixedly coupled to the mast and a second end fixedly coupled to the first runway beam.

6. The crane of claim 5, wherein the second end of the third support beam is fixedly coupled adjacent the second end of the first runway beam, and wherein the second end of the fourth support beam is fixedly coupled adjacent the first end of the first runway beam, such that the third support beam is longer than the fourth support beam.

7. The crane of claim 5, wherein each of the first direction, the second direction, the third direction, and the fourth direction are perpendicular to the vertical direction.

8. The crane of claim 7, further comprising a fifth support beam, a sixth support beam, a seventh support beam, and an eighth support beam, the fifth support beam, the sixth support beam, the seventh support beam, and the eighth support beam each comprising a first end fixedly coupled to the mast and a second end fixedly coupled to the at least one support beam.

9. The crane of claim 8, wherein the fifth support beam extends along a fifth direction, the sixth support beam extends along a sixth direction, the seventh support beam extends along a seventh direction, and the eighth support beam extends along an eighth direction.

10. The crane of claim 9, wherein the fifth support beam extends from the top end of the mast to the first support beam, whereby the fifth support beam is fixedly coupled to the first support beam at a location between the first end and the second end of the first support beam;

the sixth support beam extends from the top end of the mast to the second support beam, whereby the sixth support beam is fixedly coupled to the second support beam at a location between the first end and the second end of the second support beam;

the seventh support beam extends from the top end of the mast to the third support beam, whereby the seventh support beam is fixedly coupled to the third support beam at a location between the first end and the second end of the third support beam; and the eighth support beam extends from the top end of the mast to the fourth support beam, whereby the eighth support beam is fixedly coupled to the fourth support beam at a location between the first end and the second end of the fourth support beam.

11. The crane of claim 1, wherein the first runway beam and the second runway beam are substantially parallel to each other.

12. The crane of claim 1, wherein the horizontal direction is a first horizontal direction, and wherein the bridge extends along a second horizontal direction that is perpendicular to the first horizontal direction and the vertical direction.

13. The crane of claim 1, wherein the mast is located substantially equidistant from both the first runway beam and the second runway beam.

14. The crane of claim 1, wherein the base end of the mast is fixedly coupled to a ground surface, the base end comprising:

a first support portion extending along a ninth direction perpendicular to the vertical direction;

a second support portion extending along a tenth direction; and a third support portion extending along an eleventh direction, wherein each of the second support portion and the third support portion extend perpendicular to the vertical direction and the ninth direction, and wherein the tenth direction extends opposite the eleventh direction.

15. The crane of claim 14, wherein the ninth direction extends parallel with the horizontal direction such that the first support portion extends substantially parallel to the first runway beam and the second runway beam.

16. The crane of claim 14, wherein each of the first support portion, the second support portion, and the third support portion is fixedly coupled to the ground surface via a mechanical coupling mechanism selected from the group consisting of a bolt, an anchor, a fastener, and combinations thereof.

17. The crane of claim 1, wherein the base end of the mast is fixedly coupled to a counterweight, the counterweight restably coupled to a ground surface.

18. The crane of claim 17, wherein the counterweight comprises a plurality of wheels configured to roll the crane across the ground surface.

19. The crane of claim 17, wherein the counterweight comprises a plurality of forklift pockets, each forklift pocket configured to receive a fork of a forklift to thereby move the crane across the ground surface.

20. The crane of claim 1, wherein the base end of the mast comprises at least one support portion extending along a twelfth direction, wherein the at least one support portion defines a length directly related to a capacity of the crane.

* * * * *